(12) United States Patent
Deng et al.

(10) Patent No.: US 11,477,789 B2
(45) Date of Patent: Oct. 18, 2022

(54) METHODS, APPARATUSES AND SYSTEMS FOR CONFIGURING/RECONFIGURING PHYSICAL CHANNEL MONITORING OCCASION IN A WIRELESS NETWORK

(71) Applicant: IDAC Holdings, Inc., Wilmington, DE (US)

(72) Inventors: Tao Deng, Roslyn, NY (US); Yugeswar Deenoo, Chalfont, PA (US)

(73) Assignee: IDAC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/733,087

(22) PCT Filed: Oct. 29, 2018

(86) PCT No.: PCT/US2018/057909
§ 371 (c)(1),
(2) Date: May 13, 2020

(87) PCT Pub. No.: WO2019/099176
PCT Pub. Date: May 23, 2019

(65) Prior Publication Data
US 2020/0389847 A1 Dec. 10, 2020

Related U.S. Application Data

(60) Provisional application No. 62/668,752, filed on May 8, 2018, provisional application No. 62/629,434, filed
(Continued)

(51) Int. Cl.
*H04B 7/0408* (2017.01)
*H04B 17/309* (2015.01)
(Continued)

(52) U.S. Cl.
CPC ........ *H04W 72/046* (2013.01); *H04B 7/0408* (2013.01); *H04B 17/309* (2015.01);
(Continued)

(58) Field of Classification Search
CPC .. H04B 7/02–12; H04B 17/0082–3913; H04L 5/0001–0098; H04J 11/0023–93; H04J 11/0003–00096; Y02D 30/70; H04W 8/22–245; H04W 16/28; H04W 24/02–10; H04W 52/0209–0296; H04W 72/005–14; H04W 74/002–008; H04W 76/10–50; H04W 84/02–16;
(Continued)

(56) References Cited

U.S. PATENT DOCUMENTS

2018/0227887 A1* 8/2018 Hakola ............... H04B 7/022
2019/0132851 A1* 5/2019 Davydov ............ H04B 7/0874

OTHER PUBLICATIONS

Qualcomm Inc., Control channel multi-beam operation, 3GPP Tdoc R1-1713420; 3GPP TSG RAN WG1 #90, Prague, Czech Republic, Aug. 21-25, 2017, 6 pages.
(Continued)

*Primary Examiner* — Timothy J Weidner
(74) *Attorney, Agent, or Firm* — Julian F. Santos

(57) ABSTRACT

The disclosure pertains to configuring a physical channel monitoring occasion in a wireless network and to scheduling beam failure recovery requests by an WTRU in a CONNECTED DRX state.

22 Claims, 12 Drawing Sheets

Related U.S. Application Data on Feb. 12, 2018, provisional application No. 62/586,442, filed on Nov. 15, 2017.

(51) Int. Cl.

| | | |
|---|---|---|
| *H04J 11/00* | (2006.01) | |
| *H04L 5/00* | (2006.01) | |
| *H04W 8/22* | (2009.01) | |
| *H04W 16/28* | (2009.01) | |
| *H04W 24/08* | (2009.01) | |
| *H04W 24/10* | (2009.01) | |
| *H04W 52/02* | (2009.01) | |
| *H04W 72/04* | (2009.01) | |
| *H04W 72/12* | (2009.01) | |
| *H04W 76/19* | (2018.01) | |
| *H04W 76/25* | (2018.01) | |
| *H04W 76/28* | (2018.01) | |
| *H04W 76/36* | (2018.01) | |
| *H04W 84/02* | (2009.01) | |
| *H04W 88/02* | (2009.01) | |
| *H04W 88/08* | (2009.01) | |
| *H04W 92/02* | (2009.01) | |
| *H04W 92/10* | (2009.01) | |

(52) U.S. Cl.
CPC ....... *H04J 11/0023* (2013.01); *H04J 11/0086* (2013.01); *H04L 5/0023* (2013.01); *H04L 5/0085* (2013.01); *H04W 8/22* (2013.01); *H04W 16/28* (2013.01); *H04W 24/08* (2013.01); *H04W 24/10* (2013.01); *H04W 52/0216* (2013.01); *H04W 52/0229* (2013.01); *H04W 72/1226* (2013.01); *H04W 72/1284* (2013.01); *H04W 72/1289* (2013.01); *H04W 76/19* (2018.02); *H04W 76/25* (2018.02); *H04W 76/28* (2018.02); *H04W 76/36* (2018.02); *H04W 84/02* (2013.01); *H04W 88/02* (2013.01); *H04W 88/08* (2013.01); *H04W 92/02* (2013.01); *H04W 92/10* (2013.01); *Y02D 30/70* (2020.08)

(58) Field of Classification Search
CPC ........... H04W 88/02–10; H04W 92/02; H04W 92/04; H04W 92/10
See application file for complete search history.

(56) References Cited

OTHER PUBLICATIONS

Intel Corporation, On beam indication on control and data channel, 3GPP Tdoc R1-1702200; 3GPP TSG RAN WG1 Meeting #88, Athens, Greece, Feb. 13-17, 2017, 4 pages.

Ericsson, Impacton MAC from PDCCH monitoring occasions, 3GPP Tdoc R2-1704399; 3GPP TSG-RAN WG2 Meeting #98, Hangzhou, P.R. of China, May 15-19, 2017, 4 pages.

\* cited by examiner

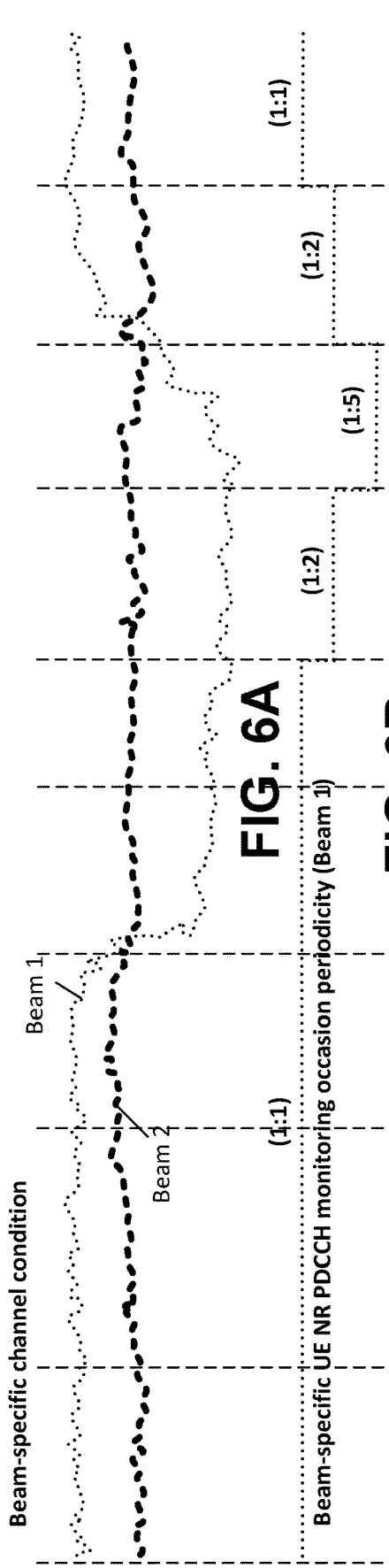
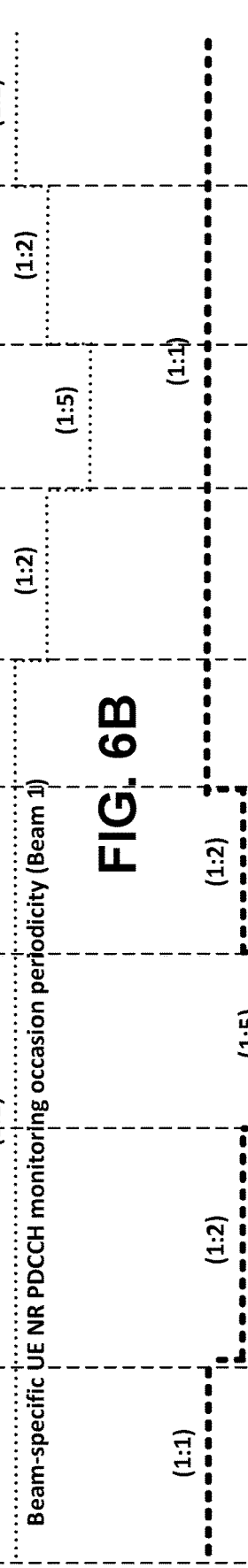
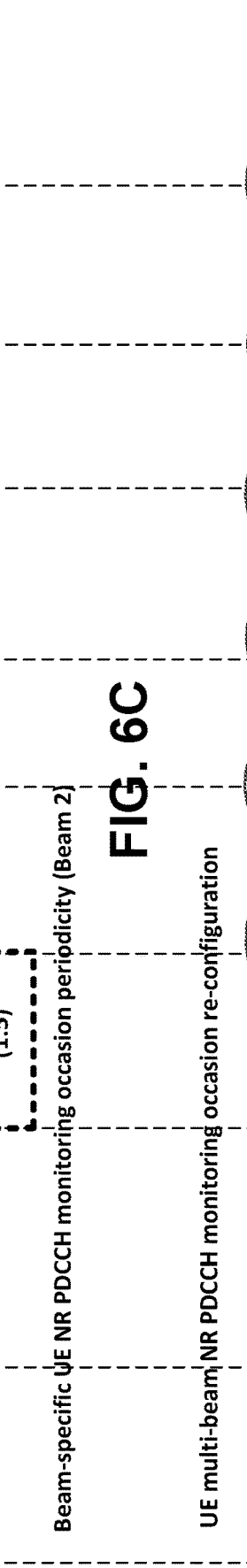
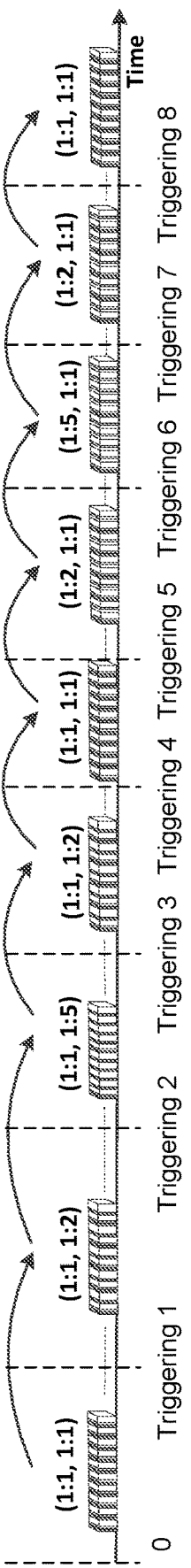
FIG. 6A
FIG. 6B
FIG. 6C
FIG. 6D

METHODS, APPARATUSES AND SYSTEMS FOR CONFIGURING/RECONFIGURING PHYSICAL CHANNEL MONITORING OCCASION IN A WIRELESS NETWORK

CROSS REFERENCE TO RELATED APPLICATIONS

This application is a 371 of International Application PCT/US2018/57909 filed 29 Oct. 2018, which claims the benefit of U. S. Provisional Patent Applications Nos. (i) 62/668,752 filed 8 May 2018, (ii) 62/629,434 filed 12 Feb. 2019, and (iii) 62/586,442 filed 15 Nov. 2017; all of which are incorporated herein by reference.

Far more than an evolution of mobile broadband, 5th Generation ("5G") is expected to meet high data rates required for the next generation of mobile telecommunication devices and will leverage large bandwidths available in a frequency range from below 1 GHz to 100 GHz with various deployments.

5G New Radio ("NR") access technology may be expected to support a number of use cases, such as enhanced Mobile Broadband (eMBB), ultra-high reliability and low latency communications (URLLC), and massive machine type communications (mMTC). Each use case comes with its own set of requirements of spectral efficiency, low latency and massive connectivity, for example. To meet the requirements, the 5G NR access technology may be expected to have a beamformed access link with beamforming for most or all physical layer signals and channels and/or various beamforming configurations.

One challenge of using higher frequencies, e.g., millimeter wave (mmW) frequencies, may be their propagation characteristics, which may be unfavorable for wireless communication, especially in an outdoor environment. Higher frequency transmissions may experience higher free space path loss. Rainfall, atmospheric gasses (e.g., oxygen), and foliage may further attenuate signals as compared to sub-6 GHz frequencies. In addition, penetration and diffraction attenuation may become more severe at certain frequencies (e.g., at mmW frequencies).

BRIEF DESCRIPTION OF THE DRAWINGS

A more detailed understanding may be had from the detailed description below, given by way of example in conjunction with drawings appended hereto. Figures in the description, are examples. As such, the Figures and the detailed description are not to be considered limiting, and other equally effective examples are possible and likely. Furthermore, like reference numerals in the figures indicate like elements, and wherein:

FIG. 6A is a graphical representation of an exemplary beam-specific channel condition (e.g., Signal-to-Interference and Noise Ratio (SINR)) for two beams (beam 1 and beam 2);

FIG. 6B is a graphical representation of an exemplary periodicity of beam-specific physical downlink channel monitoring occasion with respect to beam 1 for a UE;

FIG. 6C is a graphical representation of an exemplary periodicity of beam-specific physical downlink channel monitoring occasion with respect to beam 2 for a UE;

FIG. 6D is a graphical representation of an exemplary (re-)configuration of multi-beam physical downlink channel monitoring occasion for a UE;

DETAILED DESCRIPTION

Figure 1A:
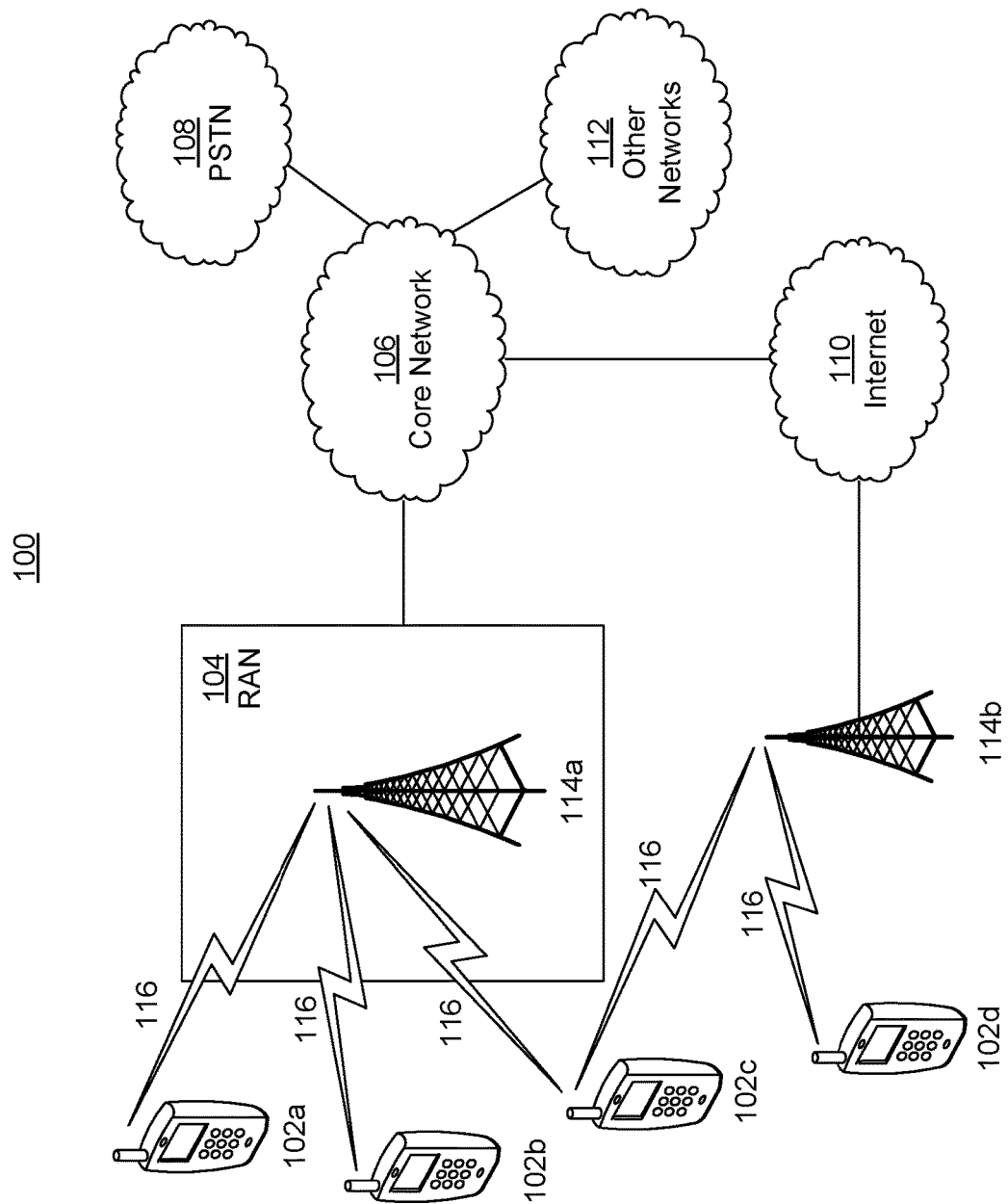
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, e.g., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (e.g., Wireless Fidelity (WiFi), IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
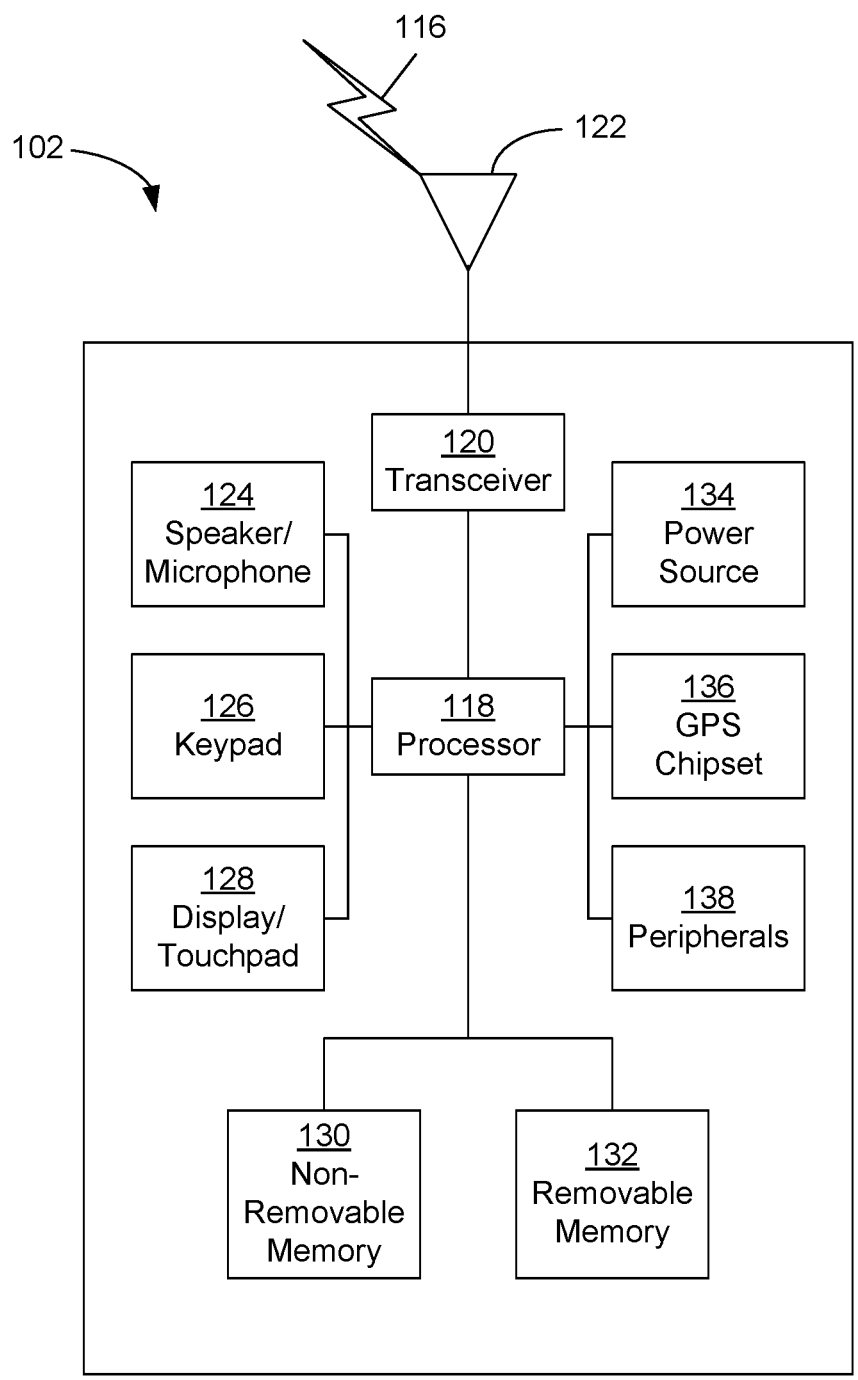
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
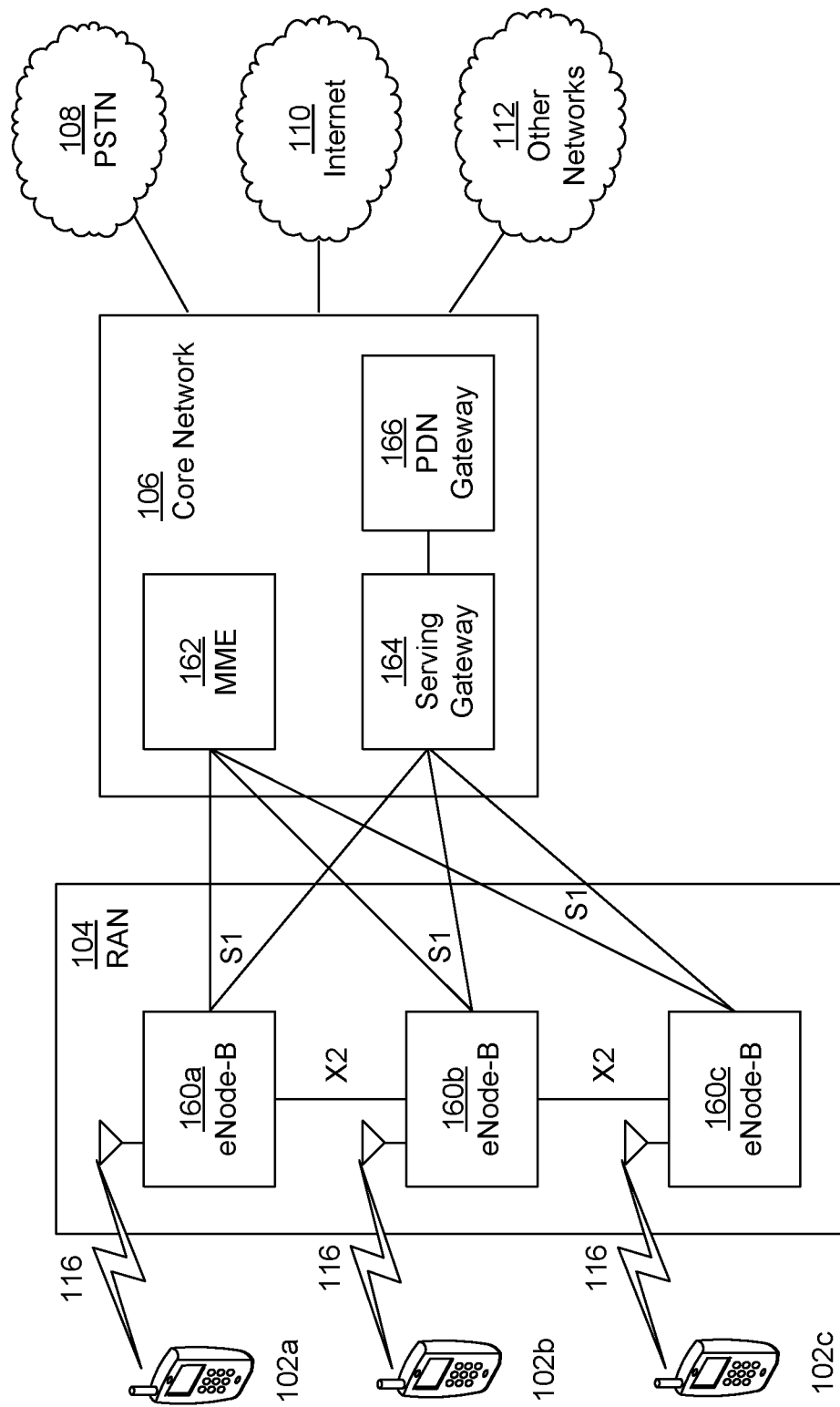
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an Si interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the Si interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
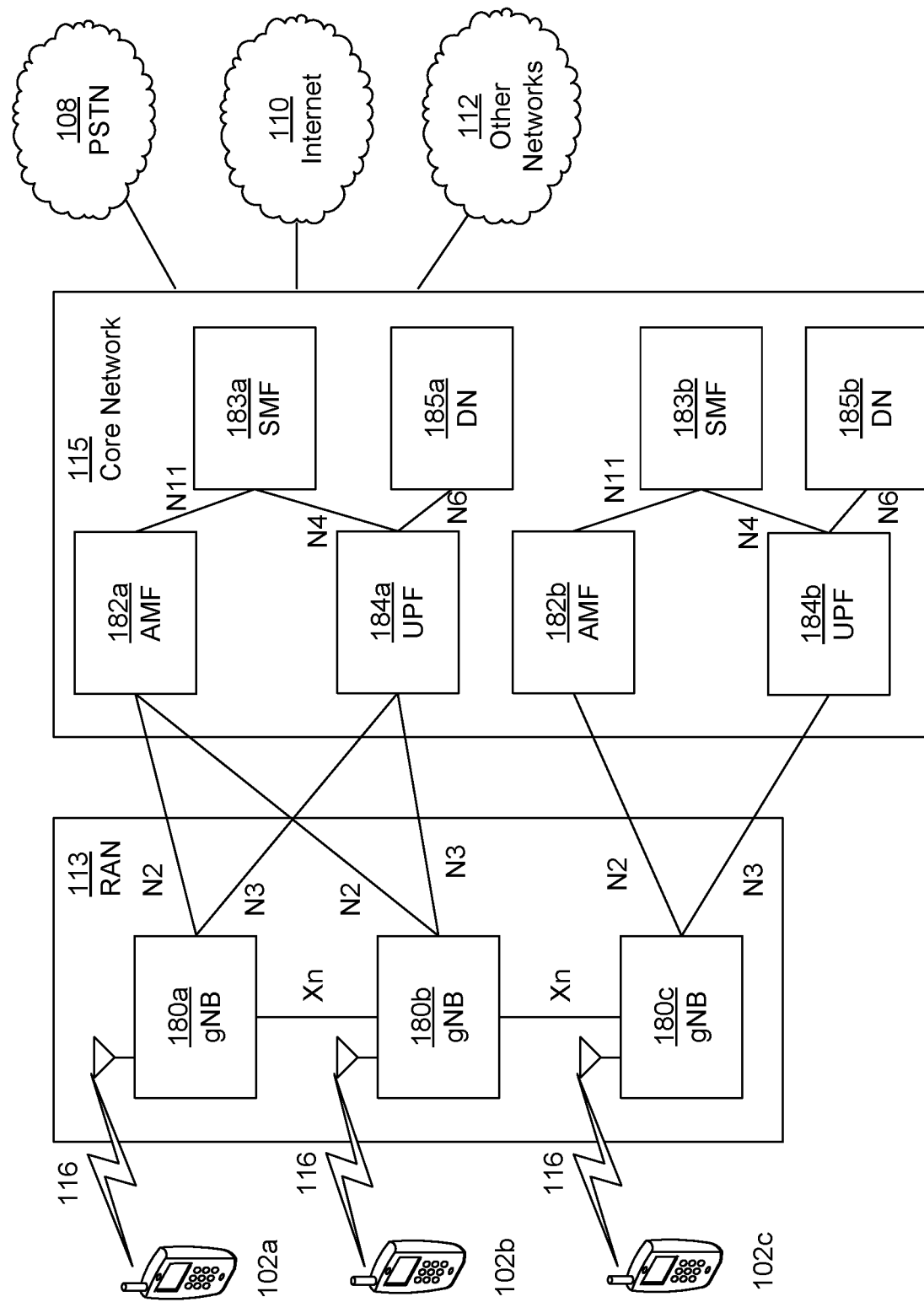
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

I. 5G NR

I.A Representative 5G NR Beam-Based Radio Access

In order to meet the high data rates required for the next generation of cellular communication systems, the 5G NR system may solve some of the challenges of using high frequencies (e.g., mmW frequencies), such as high frequency propagation characteristics that may be unfavorable for wireless communication, especially in an outdoor environment.

Particularly, the propagation characteristics of signals at mmW frequencies may result in significant Non Line-Of-Sight (NLOS) propagation path loss. For example, at mmW frequencies, NLOS path loss may be more than 20 dB higher than Line-Of-Sight (LOS) path loss and may severely limit the effective range of mmW transmissions. Recent channel measurements have demonstrated that satisfactory cellular coverage is feasible at mmW frequencies with the help of beamforming techniques. It may be shown in the measurement data that the beamforming gain not only is able to provide required coverage essential for cellular control signaling but also boost the link capacity to achieve higher data throughput in LOS conditions.

The channel propagation characteristics and the very high data throughput requirements of 5G NR cellular systems may call for specific design aspects.

For instance, the 5G NR system may use beamforming on all physical layer signals and channels, including those for broadcast and control purposes. The system design may enable a beamformed access link with beamforming for most or all physical layer signals and channels. The physical layer signals and channels may be subjected to different beamforming techniques, including digital, analog, and hybrid beamforming(s). Hybrid beamforming may comprise various beamforming configuration(s) with combinations of analog and digital beamformings, e.g., a number of antenna panels/arrays used for analog beamforming and/or a number of antenna elements used for digital beamforming.

The 5G NR system design focused on beam-based or beam-centric procedures.

Beamforming may provide an additional degree of freedom in an angular domain as compared to conventional cellular systems.

Therefore, the 5G NR system design may take into account the beamforming and beam-based features specific to each physical layer signal and channel and incorporate the corresponding control and maneuvering into the system procedures, e.g., uplink transmission, cell search, random access, control channel decoding, etc.

I.B Representative Beamforming Techniques

Beamforming techniques may include digital, analog and hybrid beamforming.

In an embodiment of digital beamforming, each antenna element may have a dedicated RF chain including RF processing and Analog-to-Digital Converter/Digital-to-Analog Converter (ADC/DAC). The signal processed by each antenna element may be controlled independently in phase and amplitude to optimize the channel capacity. The number of RF chains may be equal to the number of antenna elements. While offering very high performance, digital beamforming techniques may impose a high cost and complexity in implementation and cause high energy consumption in operation.

In another embodiment, analog beamforming may apply one RF chain for a number of antenna elements that constitute a Phased Antenna Array (PAA). Each antenna element may have a phase shifter used to set a phase-only weight for beamforming and steering of the antenna pattern of the PAA. The number of applied RF chains may be lower than the number of antenna elements. The number of RF chains may be the same or lower than the number of PAAs. For example, multiple PAAs may be connected to a single RF chain and each PAA may have an antenna pattern of specific azimuth and elevation coverage.

The RF chain may be switched to one PAA at a time, and thus a single RF chain with multiple PAAs may provide a broad coverage by using one beam in a different direction at a different time instant.

Figure 2:
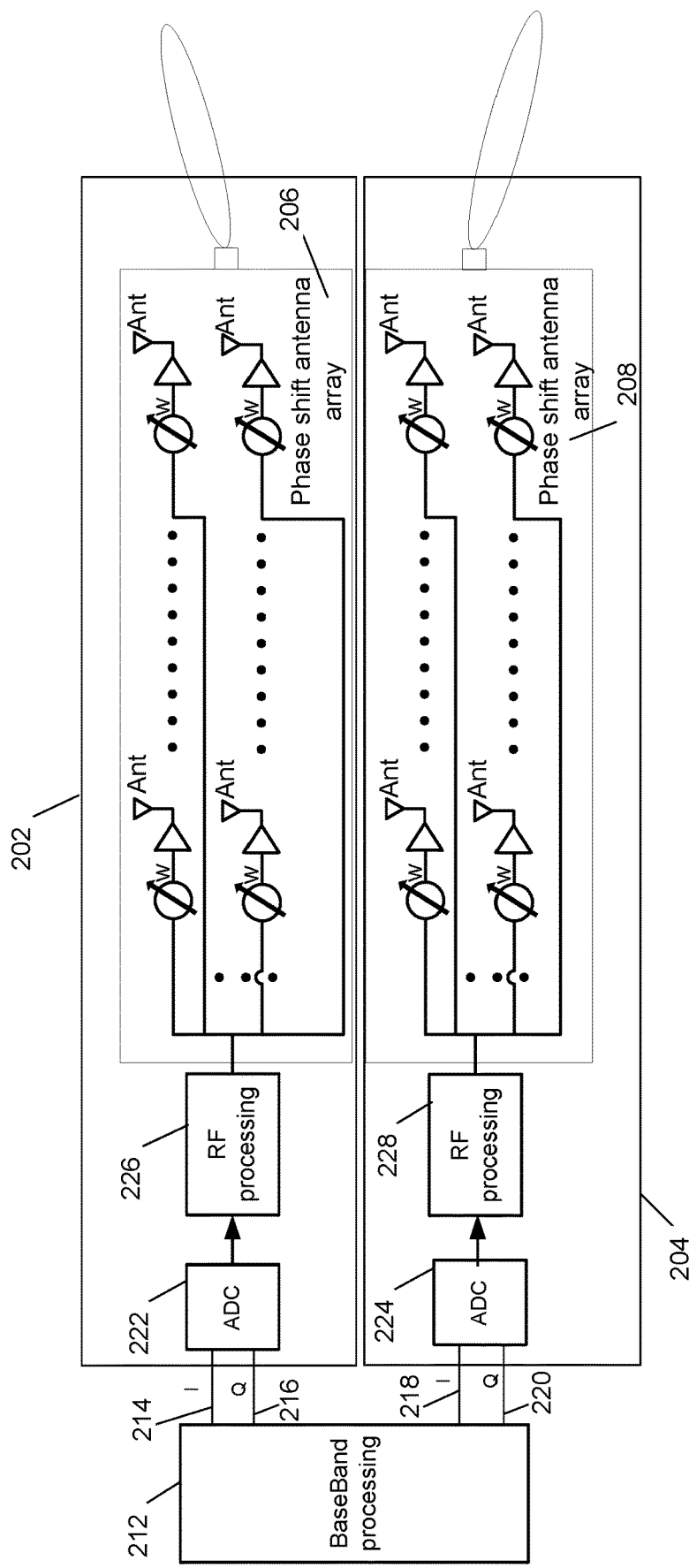
FIG. 2 is an exemplary block diagram of a beam forming process.

In other embodiments, hybrid beamforming may combine digital precoding and analog beamforming. FIG. 2 is an exemplary block diagram of a beam forming process. In particular, FIG. 2 shows an exemplary UE block diagram for a hybrid beamforming system with two transmitters 202, 204 with two phased antenna arrays 206, 208. It starts with digital pre-coding in the Base Band (BB) processing block 212. The I (214, 218) and Q (216, 220) output signals pass through the ADC blocks 222, 224 and radio frequency processing blocks 226, 228 to be transmitted via a phase shift antenna array 206, 208 for analog beamforming.

In some embodiments, the analog beamforming may be performed over antenna elements of a PAA connected to one RF chain. In some embodiment, the digital precoding may be applied to the baseband signal for each RF chain and its associated PAA. In some embodiments, configuration of the hybrid beamforming may include number of data streams, number of RF chains, number of PAAs, and number of antenna elements. One PAA connected to a RF chain may be represented by an antenna port uniquely identified by a beamformed reference signal specific to the antenna port.

The potential high implementation cost and energy consumption of digital beamforming techniques may lead to certain implementation considerations for 5G NR system design, for example:

the 5G NR beamforming technique may be based on hybrid beamforming and the number of transceivers (TRX) in a 5G NR node may be considerably less than the number of antenna elements;

analog beamforming techniques may have a significant impact on L1/L2/L3 system procedure(s) and may lead to new procedural behavior(s) and sequence(s);

beamformed transmissions may offer a high degree of flexibility to the eNB (and/or gNB) to customize transmissions both in time and spatial domain to reduce signal overhead and energy consumption.

I.C Representative NR Beamformed PDCCH Design

In some embodiments, in a beam-based NR PDCCH design framework, a UE may acquire configuration of a Control Resource Set (CORESET) during an initial access and after RRC connection establishment. The UE may be configured, in addition, with one or multiple CORESETs via UE-specific higher layer (e.g., L2 or L3) signaling.

CORESET configuration parameters may include time domain resources (e.g., any one or more of starting OFDM symbol and time duration) and frequency domain resources (e.g., any one or more of size and number of contiguous parts of the CORESET, REG bundling size and interleaving).

A CORESET may contain one or more search spaces and a UE may monitor a set of search spaces within the configured one or more CORESETs. The search spaces may be determined by parameters including, e.g., a set of aggregation levels, a number of NR PDCCH candidates for each aggregation level, and a NR PDCCH monitoring occasion for the set of search spaces. A UE may also acquire Quasi-colocation (QCL) configuration of NR PDCCH using a reference to a Transmission Configuration Indication (TCI) state. The TCI state may be associated with a set of reference signals that may indicate QCL configuration of control and/or data channel.

In other words, unlike the mostly pre-defined structure of LTE PDCCH, NR PDCCH design is highly flexible and configurable in time, frequency, and spatial domain, which may desirably enable a more efficient NR PDCCH monitoring optimized for UE service type, UE capability, and beam-specific channel conditions.

To achieve high robustness of NR PDCCH transmissions against downlink beam pair link (BPL) blockage, a UE may be configured to monitor NR PDCCH on one or more beam pair links simultaneously. For clarity, note that a downlink BPL is defined as a directional downlink transmit beam directed from a transmitting node (e.g., a gNB) toward a receiving node (e.g., the UE) and a corresponding directional downlink receive beam directed from the receiving node (the UE) toward the transmitting node (the gNB). Together, the BPL may establish a downlink radio link between the two nodes. In some embodiments, for instance, a UE may be configured to monitor NR PDCCH at different OFDM symbols in multiple beam pair links.

However, each downlink BPL may experience short term channel condition variations in addition to blockage. Accordingly, it would be desirable to consider the following factors in designing a multi-beam NR PDCCH monitoring scheme, e.g., in order to achieve high efficiency and low UE battery consumption.

A first factor is unnecessary NR PDCCH processing and transmission overhead. Specifically, a UE may perform blind decoding on each downlink BPL, e.g., when the multi-beam NR PDCCH monitoring is configured. However, when the channel conditions are satisfactory for NR PDCCH decoding in each configured downlink BPL, decoding over multiple beam pair links may be unnecessary as it may cause excessive UE battery consumption with little or no resultant benefit. It may also result in large gNB NR PDCCH transmission overhead and high blocking probability in the beam-specific search spaces.

A second factor is mismatch between NR PDCCH decoding performance and L1 RSCP/CSI (Received Signal Code Power/Channel State Information) feedback. A gNB (and/or eNB) may configure a UE with multiple beam pair links for NR PDCCH monitoring based on one or more of L1 RSCP and CSI feedback. The measurement result of beam-specific reference signals, e.g., CSI-RS or synchronization signal block (SSB), may not accurately reflect NR PDCCH decoding performance, e.g., due to a difference of resource allocation between the reference signals and CORESET.

Furthermore, a beamformed NR PDCCH transmission may be subject to a dominant interference, e.g., another beamformed transmission from a neighbor cell (e.g., inter-cell TDD UL-to-DL beam leakage) or the serving cell (e.g., intra-cell inter-DL-beam due to low isolation between DL beams). SNR-based feedback such as L1-RSRP and CSI may be considerably less accurate with this type of non-white noise interference.

A third factor is individual beam failure without UE beam failure detection and recovery. Beam link failure may be determined based on hypothetical PDCCH block error ratio (BLER). For example, a UE may establish a correlation between hypothetical PDCCH BLER and a reference signal measurement. Beam link failure may be determined using measurement of Radio Link Measurement (RLM) reference signal (RS). In an embodiment, the RLM RS may be any one of CSI-RS for L1 beam management, SSB, and new reference signals. In some embodiment, the RLM RS measurement results may not be reported to the gNB (and/or eNB). A UE may not trigger a beam failure and initiate beam failure recovery until all monitored beams fail.

When a UE is configured with multi-beam NR PDCCH monitoring, one of the monitored beams may fail while another beam may be good. This may be due to, e.g., short-term channel variation (not correlated between beams). The NR PDCCH monitoring occasion (re-)configuration may be performed more frequently on the failed beam and it may be more efficient, e.g., when the NR PDCCH beam-specific monitoring (re-)configuration is performed mostly consistent with the beam quality variation.

A fourth consideration may be higher layer (re-)configuration signaling overhead. Frequent (re-)configuration of beam-specific NR PDCCH monitoring occasion (e.g., via higher layer signaling) may result in high signaling overhead and latency.

A fifth factor is beam failure recovery processing during UE CONNECTED DRX mode. During CONNECTED DRX mode, a UE may be configured to monitor NR PDCCH in one or multiple beams during the wake-up period, i.e. ON duration. When a UE detects a beam failure during the wake-up period, e.g., due to UE mobility and orientation change, the UE may attempt a Beam Failure Recovery Request (BFRR) procedure as currently specified in 3GPP TS 38.213 V15.1.0 (2018-03). However, the UE may again detect a beam failure and, therefore, immediately re-enter DRX mode after a successful BFRR and after establishing new beam(s) for NR PDCCH monitoring for ON duration before any user data communication ever occurs. In fact, the UE may repeat such BFRR efforts many times without ever transmitting or receiving any user data. All of these BFRR efforts, except the one immediately preceding a user data transmission/reception may be of no use to the UE. To reduce such wasteful processing, it may be helpful to have a mechanism that inhibits a UE from performing BFRR during DRX mode except when the UE expects user data communication.

Overall, new mechanisms may enable a dynamic (re-)configuration of beam-specific NR PDCCH monitoring occasion that follows closely to per-beam channel variation in order to achieve multi-beam NR PDCCH monitoring with efficient resource utilization and improved UE processing.

In this disclosure, the term physical downlink channel may include a physical downlink control channel (PDCCH) and a physical downlink shared channel (PDSCH). Although this disclosure describes configuration or re-configuration (herein, "(re-)configuration") of NR beamformed PDCCH monitoring occasions for exemplary purposes, it should be understood that the methods and embodiments disclosed herein are applied to (re-)configuration of any beamformed physical downlink channel monitoring occasions in any radio access network or system.

In this disclosure, the term "beam" may be used to refer to at least one of the following:
  a set of pre-coding weights or co-phasing weights applied to antenna elements in a UE or in a network equipment (e.g., TRP) for reception or transmission;
  an antenna or radiation pattern resulting from applying such pre-coding or co-phasing weights;
  a set of properties associated with an antenna pattern, such as a gain, directivity, beam width, beam direction (e.g., with respect to a plane of reference) in terms of azimuth and elevation and peak to side lobe ratio;
  at least one antenna port associated with the beam;
  at least one reference signal transmitted while applying the set of pre-coding weights to the antenna elements;
  at least one sequence used for generation of a reference signal; and
  an associated number and/or configuration of antenna elements (e.g., uniform linear array, uniform rectangular array, etc.).

II. (Re-)Configuration of Multi-Beam NR PDCCH Monitoring

II.A (Re-)Configuration of Multi-Beam NR PDCCH Monitoring

In an embodiment, a UE may be configured to monitor NR PDCCH on multiple downlink beams. In an embodiment, the UE may be configured with one or more CORESETs on each configured downlink beam and may be configured to monitor one or more search spaces associated with each CORESET on each configured downlink beam. The UE may determine the configured downlink beam for NR PDCCH decoding, e.g., based on QCL configuration that may be specific to the CORESET and/or search space.

FIGS. 3A-3D show an exemplary beam-specific PDCCH monitoring scenario and (re-) configuration involving two beams.

Figure 3B:
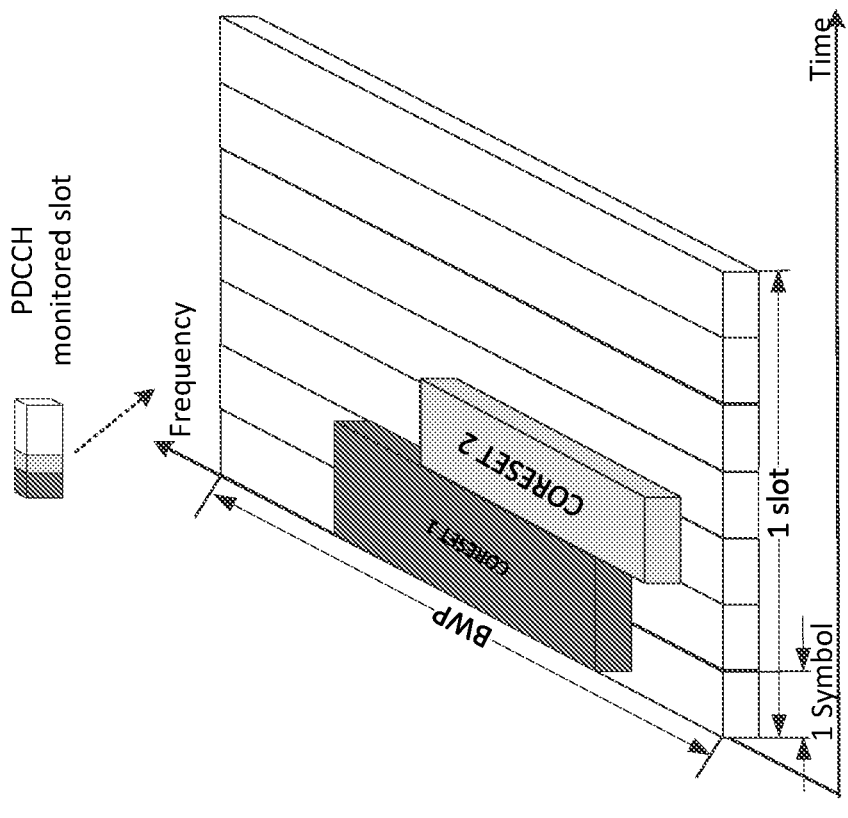
FIG. 3B is an exemplary monitoring physical downlink channel search space in a configured monitored slot(s) in accordance with an exemplary embodiment.
Figure 3A:
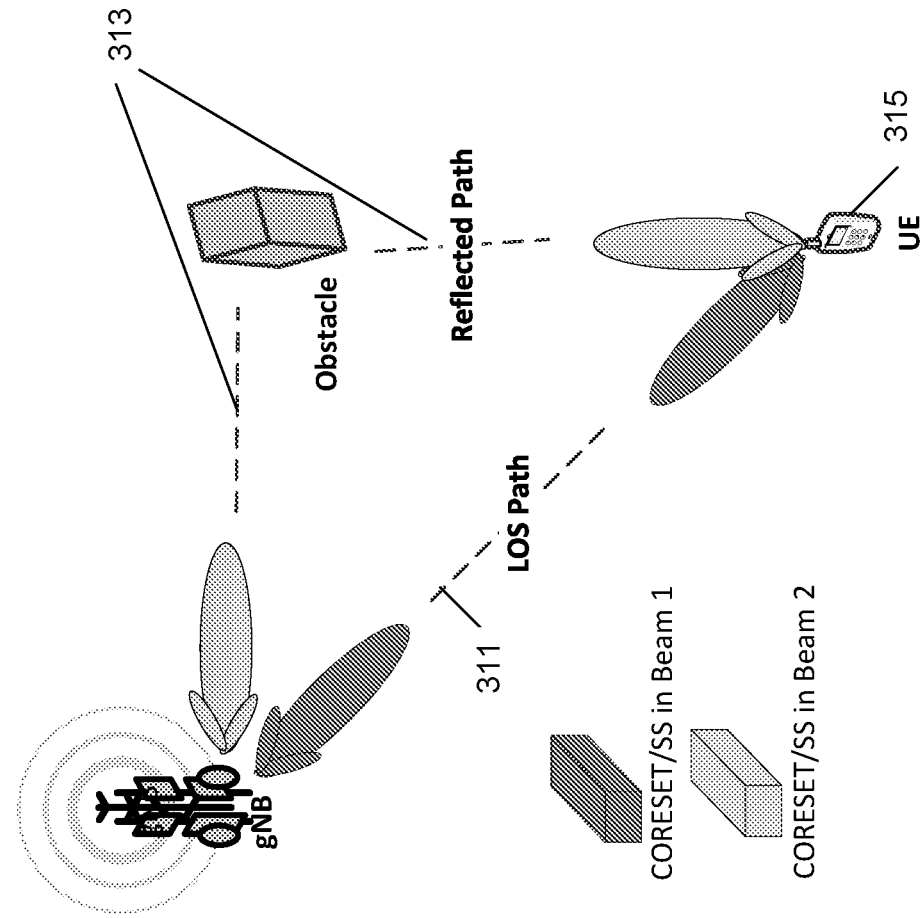
FIG. 3A is a system diagram illustrating beam-specific physical downlink channel (e.g., PDCCH) transmission process in accordance with an exemplary embodiment.

FIG. 3A is a system diagram illustrating a beam-specific physical downlink channel transmission process between a gNB 309 and a UE 315 in accordance with an exemplary embodiment. The UE may monitor NR PDCCH in two downlink beams of which one downlink beam may be line-of-sight (LOS) 311 and the other a Pt order reflected path 313 (e.g., due to an obstacle). The UE 315 may be configured to monitor NR PDCCH on these two beams to ensure NR PDCCH decoding robustness, e.g., against blockage condition occurring to the LOS downlink beam.

FIG. 3B illustrates an exemplary monitoring physical downlink channel search space in a configured monitored slot(s) in accordance with an exemplary embodiment. In this configuration, the UE monitors PDCCH search spaces in CORESET 1 and CORESET 2 in beam 1 and beam 2, respectively, in the configured monitored slot. More particularly, the UE monitors beam 1 in the first two symbols of each slot and monitors beam 2 in the third symbol of each slot.

Figure 3D:
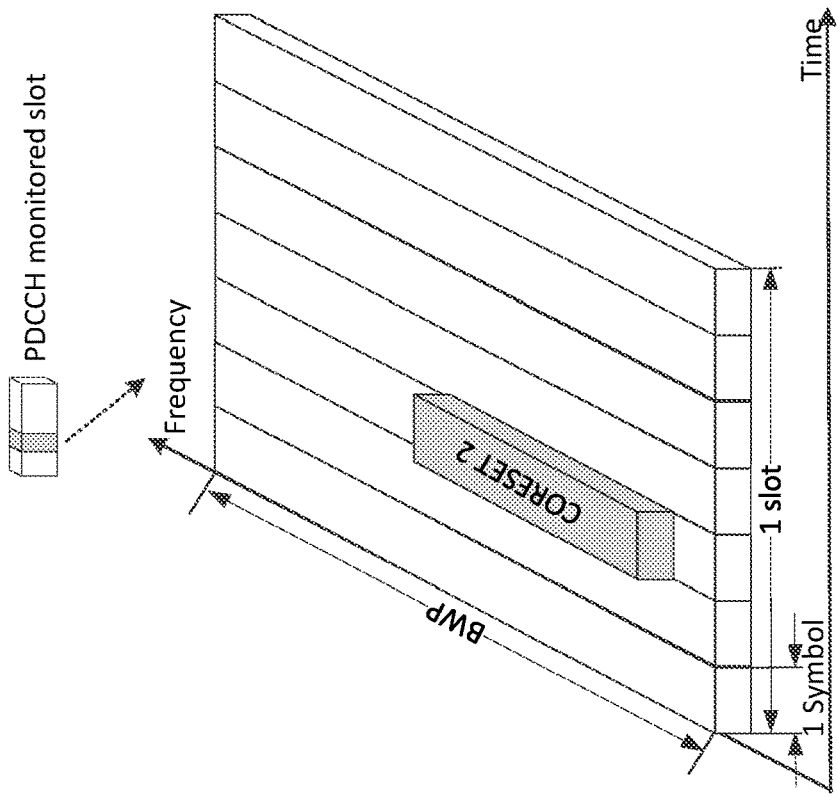
FIG. 3D is a further exemplary monitoring physical downlink channel search space in a configured monitored slot(s) in accordance with another exemplary embodiment.
Figure 3C:
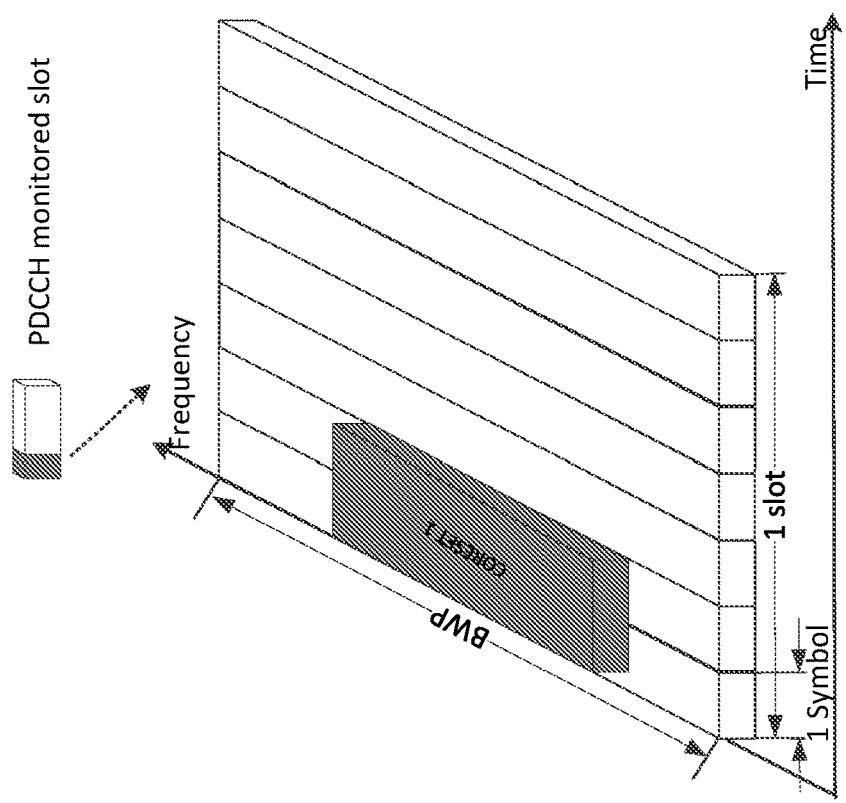
FIG. 3C is another exemplary monitoring physical downlink channel search space in a configured monitored slot(s) in accordance with another exemplary embodiment.

FIG. 3C illustrates another monitoring physical downlink channel search space in a configured monitored slot(s) in accordance with an exemplary embodiment. In particular, FIG. 3C shows a UE monitoring PDCCH search spaces in only CORESET 1 in beam 1 in the configured monitored slot.

FIG. 3D illustrates another monitoring physical downlink channel search space in a configured monitored slot(s) in accordance with an exemplary embodiment. Specifically, FIG. 3D shows a UE monitoring PDCCH search spaces in only CORESET 2 in beam 2 in the configured monitored slot.

Although the examples of FIGS. 3A-3D show NR PDCCH monitoring occasions involving two beams, the methods and embodiments described in this disclosure may be applied when more than two downlink beams are configured as serving control channel beams for a UE.

A UE may monitor a NR PDCCH on each configured downlink beam in accordance with a beam-specific NR PDCCH monitoring (re-)configuration, including any of the following:
- NR PDCCH search space (re-)configuration including, e.g., aggregation level, number of PDCCH candidate at each aggregation level, interleaving, etc.;
- CORESET time and frequency resources, including, e.g., starting symbol, duration of the CORESET, resource block, etc.;
- (re-)configuration of NR PDCCH monitoring occasion including monitored slot periodicity (e.g., every 1 slot (1:1), every two slots (1:2), every five slots (1:5), every ten slots (1:10), every twenty slots (1:20), etc.,) and/or monitored symbol number within the monitored slot, etc.; and
- processing (re-)configuration, including maximum blind decoding attempts and time gap (or time duration) configured for UE RX beam switch between CORESETs associated with the configured downlink beams.

In some embodiments, depending on (re-)configuration of the NR PDCCH monitoring occasion on each downlink beam, a UE may monitor one or more CORESETs and/or one or more search spaces on all configured downlink beams in the monitored slot, hereinafter termed a full monitored slot. The UE also may monitor multiple CORESETs and/or search spaces on one or fewer than all of the downlink beams in the monitored slot, e.g., partial monitored slot. In some embodiments, a UE may be configured with non-slot-based NR PDCCH monitoring on several consecutive or non-consecutive OFDM symbols.

A UE may be configured with a minimum periodicity (i.e., maximum frequency) per-beam NR PDCCH monitoring occasion, e.g., one monitoring occasion every 1 slot (1:1). In some embodiments, the UE may (e.g., always) utilize the minimum NR PDCCH monitoring occasion periodicity on at least one of the configured downlink beams during multi-beam NR PDCCH monitoring, while utilizing less frequent monitoring on the other beams.

In some embodiments, a UE may be configured with a maximum number of total blind decoding attempts for one NR PDCCH monitored slot. In some embodiments, the UE may determine the per-beam amount of blind decoding attempts based on beam-specific NR PDCCH monitoring (re-)configuration, such as CORESET and search space (re-)configuration. In some embodiments, the UE may ensure that the total amount of blind decoding in a full monitored slot for multi-beam NR PDCCH monitoring may not exceed the configured maximum number of blind decoding attempts.

As shown in FIG. 3B, a UE may be configured to monitor NR PDCCH in one configured CORESET on each of the two configured downlink beams. In the full monitored slot, the UE may monitor a first CORESET at symbol 1 and 2 on Beam 1 and another COREST at symbol 3 in Beam 2. In a full monitored slot, the UE Cyclic Prefix (CP) may monitor both configured downlink beams and may switch the receiver beam during the period or a pre-configured gap. In a partial monitored slot, the UE may monitor one or a sub-set of the configured downlink beams for multi-beam NR PDCCH monitoring.

Figure 4:
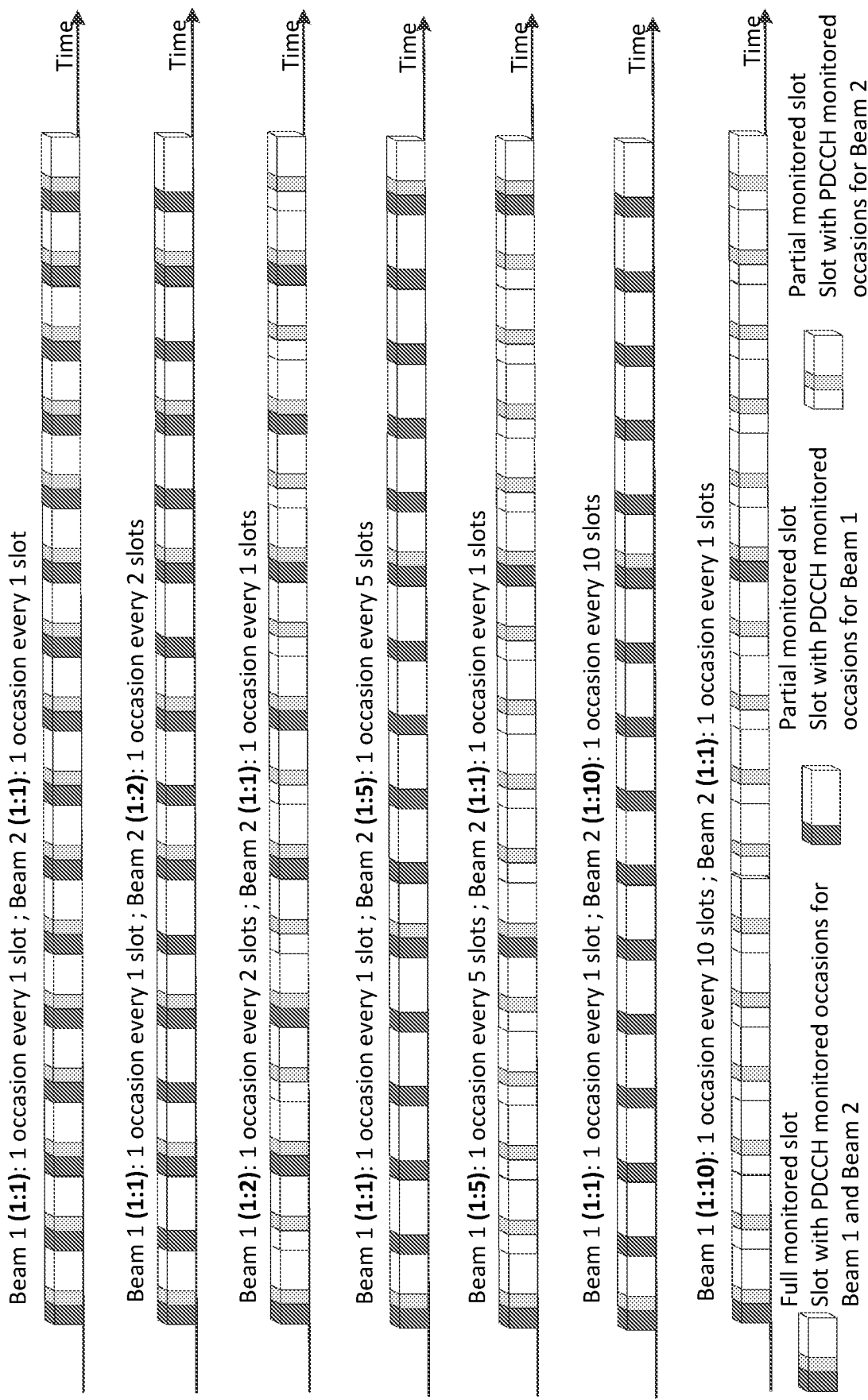
FIG. 4 is exemplary (re-) configurations of beam-specific monitoring occasions.

FIG. 4 shows exemplary (re-)configurations of beam-specific monitoring occasions. In some embodiments, a UE may be configured with a particular scheme of NR PDCCH monitoring occasion periodicity. This periodicity may indicate how often a UE may monitor a NR PDCCH occasion. FIG. 4 illustrates seven (7) exemplary (re-)configurations of a set of corresponding UE NR PDCCH slot-based monitoring occasion periodicity. Any particular configured set of NR PDCCH monitoring periodicity may be expressed as (X:Y) in which X is a number of each monitoring occasion (e.g., one monitoring occasion of one slot) and Y is the periodicity (measured using the same units) between monitoring occasions, e.g., 1, 2, 5, 10 and 20 slots. Thus, with a monitoring occasion periodicity of (1:1), a UE may monitor NR PDCCH in one monitored slot once every slot. With (1:5), the UE may monitor NR PDCCH in one monitored slot every five slots.

In some embodiments, a UE may be configured with a default monitoring occasion of one slot and interval of one slot (1:1), e.g., monitoring once every slot for slot-based NR PDCCH monitoring. In embodiments, a UE may maintain the default monitoring occasion periodicity on one or a subset of the configured downlink beam in the multi-beam NR PDCCH monitoring (re-)configuration while varying the occasion on other beam(s).

In embodiments, a UE may receive a multi-beam NR PDCCH monitoring (re-) configuration via high layer signaling (e.g., L2 or L3). In embodiments, the gNB (or eNB) may select downlink beams based on UE L1 beam measurement feedback, e.g., L1-RSCP, beam-specific CSI, beam link monitoring measurement, HARQ feedback, etc. With beam-specific NR PDCCH monitoring over multiple beams, a UE may verify a per-beam NR PDCCH decoding result, e.g., based on the NR PDCCH decoding results over (e.g., all) the downlink beams. In embodiments, a UE may adjust the NR PDCCH monitoring (re-)configuration on each configured downlink beam. This allows the UE to more efficiently utilize the spatial resources and improve the NR PDCCH decoding processing.

II.B Identical DCI and Conditional NR PDCCH Decoding

In an embodiment, on each configured downlink beam, a UE may be configured to monitor identical (or substantially similar) DCI formats and content, e.g., DCIs for scheduling information of NR PDSCH or NR PUSCH in the multi-beam NR PDCCH monitoring. As shown in FIGS. 3A-3D and 4, the UE may be scheduled (e.g., by a gNB or eNB) with a NR PDSCH in the full monitored slot. The UE may decode and receive identical (or substantially similar) scheduling information transmitted in both Beam 1 and Beam 2, e.g., the starting symbol number, TCI state, transport format, etc.

Configured with monitoring identical DCI transmissions, a UE may perform a conditional NR PDCCH decoding on one or more configured downlink beams. The UE may perform the conditional NR PDCCH decoding on the configured downlink beam(s), e.g., based on the NR PDCCH decoding result(s) of a preceding downlink beam. For instance, in some embodiments, in a full monitored slot, a UE may decode the NR PDCCH in the $1^{st}$ monitored downlink beam and may buffer the signal received in (e.g., all) the other configured downlink beams for subsequent NR PDCCH decoding of the same DCI transmission, if deemed necessary. For example, in the full monitored slot, in FIG. 3B, the UE may decode the NR PDCCH received in symbols 1 and 2 from Beam 1 and buffer the signal received at symbol 3 for decoding of the DCI transmitted in Beam 2, if later deemed necessary.

In embodiments, if the UE correctly decodes the DCI transmitted in the $1^{st}$ monitored downlink beam (e.g., with good CRC), the UE may discard the buffered signal from other configured downlink beams without further NR PDCCH decoding. If, on the other hand, the NR PDCCH decoding of the $1^{st}$ monitored downlink beam is unsuccessful (e.g., with bad CRC), the UE may continue with the decoding of the buffered NR PDCCH data transmitted in the $2^{nd}$ configured downlink beam (e.g., and/or the other downlink beams).

In some embodiments, a UE may decode the DCI transmitted in each of the other configured downlink beams. That is, the UE may maintain and update a beam-specific NR PDCCH decoding status based on the per-beam NR PDCCH decoding result. For example, in FIG. 3B, the UE may decode DCI in each of Beam 1 and Beam 2 and maintain a NR PDCCH decoding status such as NR PDCCH BLER for each beam.

In other embodiment, the UE may use (e.g., soft) combining of the NR PDCCH decoded data in the buffer of each configured downlink beam, for example, when NR PDCCH decoding results on multiple downlink beams may be unsuccessful. In the example shown in FIG. 3B, the UE may decode the buffered NR PDCCH data from Beam 2 and (e.g., soft) combine the buffers of both Beam 1 and Beam 2 for NR PDCCH decoding. Soft combining may refer to combining energy of decoded bits in multiple buffers.

II.C Downlink-Beam-Specific HARQ Feedback

In an embodiment, a UE may include information in HARQ feedback that may indicate in which of the configured downlink beams the associated NR PDCCH decoding was successful. In another embodiment, the UE may include a downlink beam indication, e.g., such as TCI of the downlink beam that was successfully NR PDCCH decoded. In another embodiment, the UE may apply a HARQ codebook design based on a HARQ bit for each downlink beam configured for the multi-beam NR PDCCH monitoring. In other embodiments, the UE may be configured with HARQ feedback resources specific to each configured downlink beam for multi-beam NR PDCCH monitoring. For example, a UE may transmit HARQ feedback in the uplink beam associated with the downlink beam in which the DCI associated with the HARQ feedback was successfully received. As a result, the UE may provide the gNB (or the eNB) with the information about beam-specific NR PDCCH decoding status by using the downlink-beam-specific HARQ feedback.

II.D Embodiment D: Different DCI and Corroborative NR PDCCH Decoding

A UE may use DCI information in one configured downlink beam in multi-beam NR PDCCH monitoring to corroborate the DCI decoding integrity of another monitored downlink beam.

In an embodiment, on each configured downlink beam, a UE may be configured with monitoring different DCI formats and content, e.g., one DCI for NR PDSCH scheduling and another DCI carrying information pertaining to the DCI transmission on another beam.

In some embodiments, in a configured downlink beam with default NR PDCCH monitoring occasion periodicity (1:1), the UE may monitor DCI with NR PDSCH/PUSCH scheduling information. In another configured downlink beam with (1:10) NR PDCCH monitoring occasion periodicity, the UE may be configured to monitor a corroborative DCI that may include information to indicate how many NR PDSCHs may have been scheduled during a time window of associated slots, e.g., ten slots. The information may be an absolute count of the NR PDSCH/PUSCH scheduling instances and/or a bit map indicating which of the associated slots may contain a NR PDSCH/PUSCH scheduling.

In some embodiments, using this corroborative DCI scheme, a UE may be able to determine whether a bad NR PDCCH CRC result that was decoded on one configured downlink beam was the result of DCI having not been scheduled or the result of a failure to decode scheduling information that was present (e.g., based on the corroborative DCI transmitted on a different configured downlink beam).

With the corroborative information, the UE may trigger a NR PDCCH monitoring (re-)configuration based on pre-configured rules.

II.E Beam Failure Recovery Request (BFRR) Triggered by Scheduling Indication Upon Beam Failure Detection in UE CONNECTED DRX Mode As previously noted, unnecessary beam failure recovery processing during UE CONNECTED DRX mode is a concern in NR. For instance, also as previously noted, during CONNECTED DRX mode, a UE may monitor NR PDCCH in one or more beams during the ON duration. When a UE detects a beam failure during the ON duration, the UE may attempt a Beam Failure Recovery Request (BFRR) procedure and may again detect a beam failure and, therefore, immediately re-enter DRX mode after a successful BFRR and after establishing new beam(s) for NR PDCCH monitoring for ON duration before any user data communication ever occurs. This may occur repeatedly without the UE ever transmitting or receiving any user data. All of these BFRR efforts, except the one immediately preceding an actual user data transmission/reception is wasted processing. Thus, below is described a mechanism that causes a UE to perform BFRR when in DRX mode only if the UE expects user data communication.

With regard to monitoring of DL/UL data scheduling DCI and scheduling indication in UE CONNECTED DRX mode, in one embodiment, a UE during CONNECTED DRX mode may be configured to monitor a DL/UL data scheduling DCI in CORESETs transmitted within the downlink beams configured for the beam failure detection beam set. The UE may monitor a UE-specific search space associated with a CORESET within the downlink beam indicated by the TCI state of the CORESET. The reference signals associated with the TCI state may be identical to and/or quasi-co-located with the reference signals configured for the beam failure detection beam set.

Additionally or alternatively, a UE during CONNECTED DRX mode may be configured to monitor a scheduling indication in the CORESET(s) transmitted within the downlink beams configured for the beam failure recovery candidate beam set. The UE may monitor a UE-specific search space associated with a CORESET configured for the beam failure recovery response. The UE may monitor the CORESET using associated DMRS(s) that may be configured to be quasi-co-located with reference signal(s) of the beam failure recovery candidate beam set.

In one embodiment, a UE may be configured to monitor a scheduling indication in the beam failure recovery candidate beam set which may be identical to the DL/UL data scheduling DCI. In another embodiment, a UE may be configured to monitor a scheduling indication, which may be one of the corroborative DCI types discussed in earlier sections of this specification.

Alternatively, a UE may be configured to monitor a scheduling indication in the beam failure recovery candidate beam set, which may be a sequence transmitted using pre-configured resource allocation within a CORESET. A UE may determine such resource allocation, e.g., resource element index, REG index, CCE index, symbol index, etc., based on its C-RNTI and CORESET configuration such as number of PRBs and symbols.

In one embodiment, a UE in CONNECTED DRX mode may be configured to monitor a scheduling indication in the beam failure recovery candidate beam set during the ON duration using identical periodicity as the DL/UL data scheduling DCI. The UE may be configured with scheduling indication monitoring occasions with a one-to-one mapping to the DL/UL data scheduling DCI monitoring occasions.

Alternatively or additionally, a UE in CONNECTED DRX mode may be configured to monitor a scheduling indication in the beam failure recovery candidate beam set during the ON duration using triggering by the decoding results of DL/UL data scheduling DCI. This may include, for example, when a beam failure counter exceeds a pre-configured threshold and/or when a measured beam quality metric of the beams for scheduling indication monitoring exceed a pre-configured threshold.

A UE during DRX mode may monitor the quality of the downlink beams configured for a beam failure detection beam set. A UE may determine a beam failure event when measured qualities of the downlink beam(s) in a beam failure detection beam set are below a pre-configured threshold over a pre-configured time period. A UE may decide a beam failure has occurred in the beam failure detection beam set during one ON duration if the number of such beam failure events exceeds a pre-configured threshold. A UE may reset or zero-out the number of such beam failure events at the beginning of each ON duration.

In one embodiment, a UE may receive a set of beam failure monitoring configurations for the beam failure detection beam set, including any of the above-discussed threshold and period parameters. A UE may be configured to select a beam failure monitoring configuration associated with each CONNECTED DRX mode configuration. Different CONNECTED DRX mode configurations may be defined as a function of any one or more of differences in DRX cycle, length of ON duration, BWP/numerology, etc. For example, a UE may select a beam failure monitoring configuration with a low beam failure event threshold for a DRX cycle with short ON duration.

In another embodiment, a UE may modify one or more beam failure monitoring configuration parameters on its own (i.e., without receiving them individually from the network) based on the CONNECTED DRX mode configuration. For example, a UE may adjust the beam failure event threshold for a CONNECTED DRX cycle as a function of the ON duration. In this case, the UE may apply a scaling factor to increase or decrease the threshold proportional to the length of ON duration on its own without receiving an explicit instruction from the network. With such a beam failure monitoring configuration specific to a DRX cycle configuration, the UE may be ensured to complete a beam failure detection within a single ON duration length regardless of the DRX configuration.

In another embodiment, a UE may accumulate the above-discussed beam failure events over a number of ON durations to determine a beam failure. For instance, a UE may be configured with a number of ON durations after which the UE may reset the beam failure event number. A UE may also be configured to perform beam failure detection in one ON duration or over a number of ON durations based on pre-configured conditions. The pre-configured conditions may include UE speed, DRX cycle length, length of ON duration, number of downlink beams configured in the beam failure monitored beam set, etc. Alternatively, a UE may be instructed by the network regarding whether a beam failure detection may be performed within one ON duration (or over multiple ON durations).

In an example implementation using a counter in UE CONNECTED DRX mode, the UE may be configured to maintain a counter, e.g., Beam Failure Instance (BFI) counter, for the purpose of beam failure detection. For example, the UE may increment the BFI counter when a beam failure instance is indicated from lower layers. When the BFI counter reaches a preconfigured value, e.g. $BFI_{Thres}$, the UE may declare that a beam failure is determined. In some embodiments, the UE may be configured with a beam failure detection timer that is started/re-started upon receiving a beam failure instance indication from a lower layer. Upon expiration of a predetermined period of time as measured by the beam failure detection timer, the UE may reset the BFI counter value to zero.

In some embodiments, a UE may be configured to maintain the beam failure instance counters only during the ON duration of the CONNECTED DRX mode. A UE may be configured to reset the beam failure instance counters to zero at the start of the ON duration. A UE also may be configured to start/restart the beam failure detection timer at the start of the ON duration. A UE may be configured to stop the beam failure detection timer when the UE is not in active time.

In other embodiments, the UE may be configured to maintain beam failure instance counters across multiple DRX cycles. The UE may be configured to scale the beam failure detection timer and/or the $BFI_{Thres}$ as a function of the DRX cycle length configured for the UE. In another solution, the UE may be configured to consider only the active time towards the beam failure detection timer (e.g., while the beam failure counter continues to run). For example, the active time may include, but not be limited to, the time when drx-onDurationTimer or drx-InactivityTimer or drx-RetransmissionTimerDL or drx-RetransmissionTimerUL, etc. is running or when a scheduling request is pending, etc. The UE may be configured to pause the beam failure detection timer when the UE is not in active time.

Figure 5:
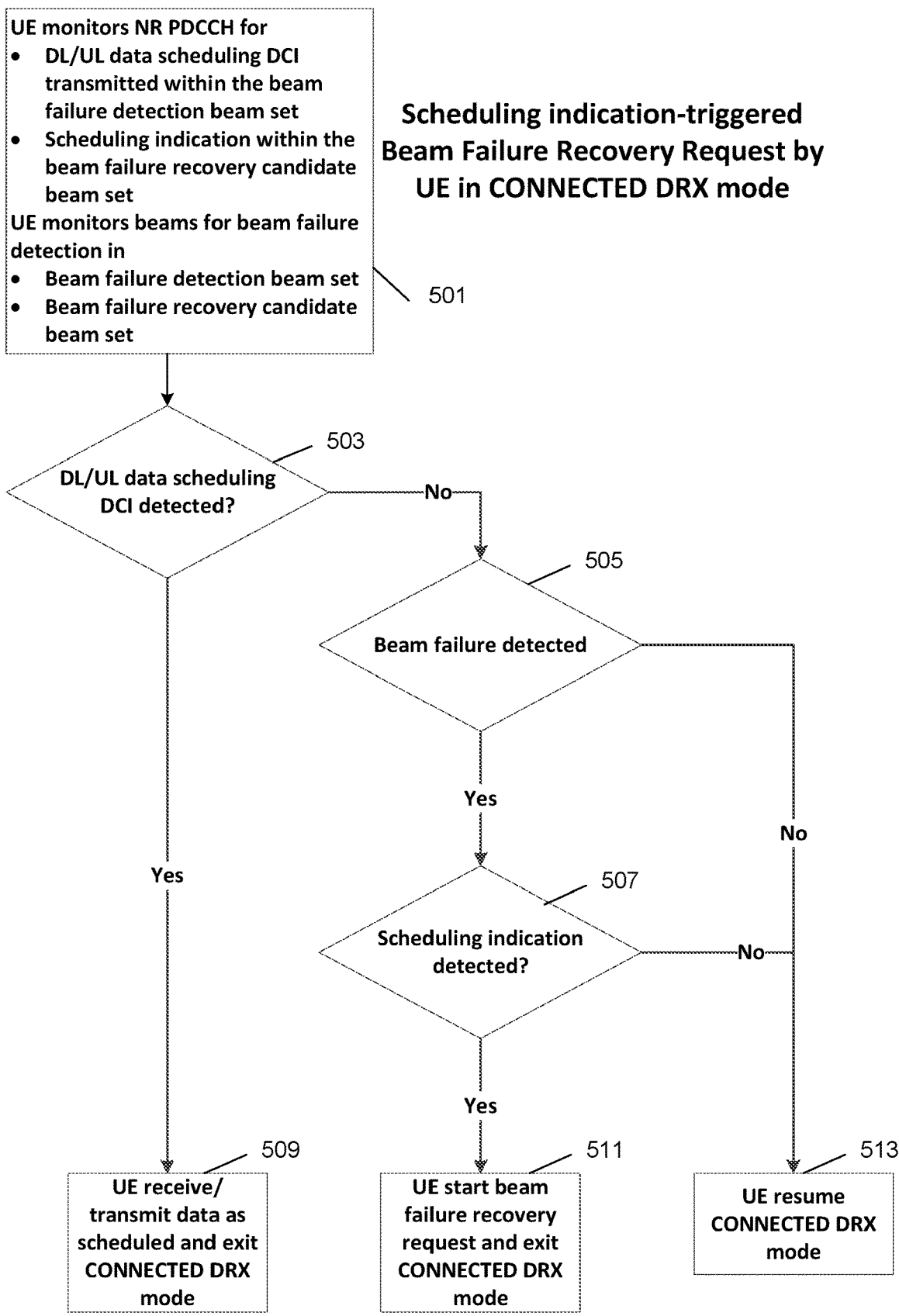
FIG. 5 is a flow diagram of scheduling of indication-triggered beam failure recovery request (BFRR) in UE CONNECTED DRX mode in accordance with an exemplary embodiment.

FIG. 5 is a flow diagram illustrating BFRR triggering responsive to a scheduling indication upon beam failure detection in UE CONNECTED DRX mode in accordance with an exemplary embodiment. In particular, during CONNECTED DRX mode, a UE is configured to perform a Beam Failure Recovery Request (BFRR) as a function of the status of three of the above-discussed monitoring events/results, namely, (1) the monitoring of DL/UL scheduling DCI within the downlink beams configured for a beam failure detection beam set, (2) the monitoring of a scheduling indication within the downlink beams configured for beam failure recovery candidate beam set, and (3) the monitoring of beam failure of the downlink beams configured for the beam failure detection beam set.

As shown in block 501 of FIG. 5, in an embodiment, a UE is configured to monitor the NR PDCCH for any DL or UL data scheduling DCI transmitted within the beam failure detections beam set and for any scheduling indication within the beam failure recovery candidate beam set. In addition, the UE also is configured to monitor the quality of beams in the beam failure detection beam set and for beam failure detection and recovery.

The UE may be configured to trigger a BFRR when the conditions described below are satisfied during an ON duration. First, as shown in block 503, the UE detects if a DL/UL data scheduling DCI in CORESETs has been transmitted within the downlink beams configured for beam failure detection beam set. If so, then flow proceeds to block 509 wherein the UE exits the CONNECTED DRX mode and receives or transmits the scheduled data.

If, on the other hand, there is no such scheduling DCI, flow proceeds from block 503 to 505, where it is determined if a beam failure has been detected within the downlink beam(s) of the beam failure detection beam set based on a beam failure monitoring configuration associated with the active DRX operation configuration. If no beam failure is detected, flow proceeds to block 513 where the UE continues in CONNECTED DRX mode. If, on the other hand, a beam failure has been detected, then flow instead proceeds from block 505 to block 507. In block 507, the UE determines if a scheduling indication has been detected in the CORESET(s) transmitted within the downlink beams configured in the beam failure recovery candidate beam set. If not, then flow proceeds to block 513, wherein the UE continues in CONNECTED DRX mode. If, on the other hand, a scheduling indication was detected, flow instead proceeds to block 511, where BFRR is performed and the WTRU exits the CONNECTED DRX mode as previously described.

In this manner, BFRR is not performed unless there is a need to do so, e.g., there actually is data that needs to be transmitted on the beam.

II.F UE-Initiated NR PDCCH Monitoring Occasion (Re-) Configuration

As noted above, new mechanisms to enable dynamic (re-)configuration of beam-specific NR PDCCH monitoring occasion as a function of, e.g., per-beam channel variation, in order to achieve multi-beam NR PDCCH monitoring with efficient resource utilization and improved UE processing are desirable and are disclosed hereinbelow.

FIGS. 6A-6D show dynamic (re-)configurations of multi-beam physical downlink channel monitoring occasion, e.g., based on beam-specific channel conditions. FIG. 6A shows a graphical representation of an exemplary beam-specific channel conditions (e.g., Signal-to-Interference Ratio (SINR)) for two beams, beam 1 and beam 2, measured by a UE over time. FIG. 6B shows a graphical representation of an exemplary periodicity of beam-specific physical downlink channel monitoring occasion with respect to beam 1 on the UE, based on the measured beam-specific channel condition. FIG. 6C shows a graphical representation of an exemplary periodicity of beam-specific physical downlink channel monitoring occasion with respect to beam 2 on the UE, based on the measured beam-specific channel condition. FIG. 6D is a different graphical representation of the exemplary (re-)configuration of the multi-beam physical downlink channel monitoring occasions on the UE shown in FIGS. 6B and 6C, showing the actual slots and monitoring occasions.

In an embodiment, a UE may modify beam-specific NR PDCCH monitoring (re-)configuration of one or more configured downlink beams based on, e.g., a set of pre-configured triggering conditions and/or rules. For instance, the UE may modify the NR PDCCH monitoring occasion periodicity to cause the UE to more frequently monitor NR PDCCH on a configured downlink beam with better channel conditions than on a configured beam with worse channel conditions.

The triggering conditions and/or rules may include at least any one or more of the following:

L1 beam management measurement(s), e.g., beam-specific L1-RSRP and/or interference measurement using beam-specific CSI-RS or SSB;

beam-specific L1 channel measurement, e.g., CQI result;

L1 beam link monitoring measurement, e.g., using beam monitoring RS;

Absolute beam-specific NR PDCCH decoding result, e.g., PDCCH BLER;

hypothetical PDCCH BLER associated with a specific beam;

successful reception of DCI in the last association window of a predetermined time period, e.g., 'x' ms (and/or 'n' number of monitoring occasions) where x and n are numbers;

a number of HARQ ACK/NACKs associated with DCI transmissions decoded in each configured downlink beam; and a number of DTX periods associated with DCI transmission decoded in each configured downlink beam.

In some embodiments, a UE may follow rules indicating down-scaling of NR PDCCH monitoring occasions, e.g., when any of L1-RSCP, CQI, and HARQ ACK exceeds a pre-configured threshold over (e.g., all) configured downlink beams with a pre-configured step size. In other words, the UE may be configured with a threshold of any of HARQ ACK, HARQ/NACK and DTX count for each configured downlink beam for NR PDCCH monitoring and the UE may scale the NR PDCCH monitoring occasion periodicity up or down depending on whether the value of the respective variable is above or below the threshold. For example, the UE may scale up or down the NR PDCCH monitoring occasion periodicity, e.g., when a run-time count of any of HARQ ACK, HARQ NACK, and DTX associated with the DCI received in each configured downlink beam exceeds pre-configured threshold. A UE may be configured with a beam-specific L1-RSCP threshold and/or CQI threshold for modifying the NR PDCCH monitoring occasion.

In some embodiments, a UE may follow rules indicating down-scaling, e.g., when the UE has (e.g., consistently and/or correctly) decoded NR PDCCH on configured downlink beams over a pre-configured period of time. In some embodiments, a UE may follow rules indicating down-scaling, e.g., when the UE measures any of L1-RSCP, CQI, and beam link monitoring quality exceeding a pre-configured threshold over a pre-configured association time window.

In other embodiments, the UE may follow rules indicating the number of aggregation levels and NR PDCCH candidates per an aggregation level associated with the one or more triggering conditions and/or rules.

In yet other embodiments, a UE may adapt the NR PDCCH monitoring occasion associated with a serving control channel beam as a function of one or more characteristics associated with such serving control channel beam. In one embodiment, such characteristics may be indicative of the quality of the beam, e.g., measurement of a reference signal associated with such beam and/or a metric associated with control channel performance (e.g., BLER, statistics associated with decoding result, etc.).

Upon satisfying any of the triggering conditions and/or rules, a UE may monitor the configured downlink beams using the modified NR PDCCH monitoring (re-)configuration.

For example, the UE may modify the NR PDCCH monitoring occasion periodicity from once every slot (1:1) to once every two slots (1:2). In some embodiments, the UE may apply a modified set of NR PDCCH monitoring (re-)configuration parameters including a number of aggregation levels, a number of PDCCH candidates per aggregation level, etc.

The modifications may include addition, removal, and/or change of the monitored DCI. In some embodiment, the modification may include replacing the DCI for NR PDSCH scheduling with a corroborative DCI with NR PDCCH transmission information on another configured downlink beam. In another embodiment, the UE may apply a modified set of NR PDCCH monitoring (re-)configuration parameters including a number of aggregation levels, a number of PDCCH candidates per aggregation level, monitoring occasion periodicity, etc.

In an embodiment, the modification may include upscaling or downscaling of the active NR PDCCH monitoring occasion periodicity, e.g., scale down NR PDCCH monitoring from once every slot (1:1) to once every two slots (1:2) or scale up NR PDCCH monitoring from once every 10 slots (1:10) to once every five slots (1:5).

In an embodiment, the modification may include upscaling or downscaling of the active NR PDCCH monitoring occasion periodicity, e.g., scale down NR PDCCH monitoring from once every slot (1:1) to once every two slots (1:2) or scale up NR PDCCH monitoring from once every 10 slots (1:10) to once every five slots (1:5). Referring to FIGS. 6A-6D, at triggering time 0, in which beam 1 and beam 2 are both strong and of high quality with beam 1 being stronger than beam 2, the NR PDCCH monitoring occasion periodicity for both beams 1 and 2 is (1:1). However, as time progresses with beams 1 and 2 both remaining in essentially the same condition, the NR PDCCH monitoring occasion periodicity for beam 2 starts to be dropped (i.e., to (1:2) at triggering time 1 and then to (1:5) at triggering time 3 to reduce NR PDCCH processing and battery consumption. Particularly, since beam 1 is strong during this period, there is less of a need to monitor NR PDCCH on beam 2. However, at triggering time 4, beam 1 quality has dropped off dramatically, while beam 2 remains relatively strong. Accordingly, it may be advisable to start monitoring NR PDCCH on beam 2 more frequently in case NR PDCCH is missed on beam 1. Thus, at triggering time 4, the NR PDCCH monitoring occasion periodicity for beam 2 is increased from (1:5) to (1:2).

Next, at triggering time 5, beams 12 and 2 remain in the same relative conditions, and therefore the NR PDCCH monitoring occasion periodicity for beam 2 is increased again, this time from (1:2) to (1:1). Next, at triggering time 6, since beam 1 continues to remain week, it is determined that NR PDCCH monitoring occasion periodicity for beam 2 should remain at (1:1) and NR PDCCH monitoring occasion periodicity for beam 1 should be dropped to (1:2) since beam 1 is no longer the dominant beam. At triggering time 7, beam 1 quality starts to increase, but is still less than the quality of beam 2. Hence, the NR PDCCH monitoring occasion periodicity for beam 1 is increased from (1:5) to (1:2), while the NR PDCCH monitoring occasion periodicity for beam 1 remains at (1:1). At triggering time 8, beam 1 quality has once again become better than beam 2. Hence, the NR PDCCH monitoring occasion periodicity for beam 1 is again increased from (1:2) to (1:1), while the NR PDCCH monitoring occasion periodicity for beam 2 remains at (1:1). Although not shown in the FIGS., if the two beams remain in these relative conditions, the NR PDCCH monitoring occasion periodicity for beam 2 will start to drop again over time.

The UE may further modify the NR PDCCH monitoring occasion periodicity from (1:2) to (1:5), (1:10), or (1:20), e.g., when pre-configured down-scaling threshold based on beam quality and/or when PDCCH BLER status may be exceeded. In some embodiments, the UE may even suspend NR PDCCH monitoring on Beam 1, e.g., when the quality of that first beam is below a threshold, when quality of Beam 2 is above a threshold, and/or when more than 'N' number of beams (e.g., not including Beam 1) is above a threshold.

In some embodiments, one or more triggering conditions and/or rules may be based on a relative difference between NR PDCCH decoding result(s) and/or measurement metrics discussed above of two (or more) different beams. For example, a UE may evaluate one or more triggering conditions and/or rules based on a difference of X dB between the L1 RSCP measurements of different configured downlink beams. In another example, a UE may evaluate one or more triggering conditions and/or rules based on the difference in the number of successfully decoded DCIs of different configured downlink beams in a pre-configured association window of a number of slots and/or a number of monitoring occasions.

In some embodiments, the UE may evaluate the mismatch between NR PDSCH scheduling instances indicated in the corroborative DCI in a configured downlink beam and NR PDSCH scheduling DCIs successfully decoded in a primary ND PDCCH monitoring downlink beam.

In some embodiments, the UE may evaluate the one or more triggering conditions/or rules over a pre-defined association window, e.g., a number of slots and/or monitoring occasions, before triggering the NR PDCCH monitoring modification.

A UE may be configured with a set of rules of NR PDCCH monitoring modification in the system broadcast information and/or higher layer signaling. In some embodiments, a UE may be configured with scale step sizes for modifying the NR PDCCH monitoring occasion periodicity. A UE may scale up or down the periodicity one step at a time following the order of the pre-configured periodicities in a descending or ascending order, respectively, such as shown in FIGS. 6B, 6C, and 6D.

By applying the one or more triggering conditions and/or rules, the UE may configure or reconfigure the multi-beam NR PDCCH monitoring occasion (e.g., in a coordinated manner with the gNB with or without explicitly signaling). In an embodiment, the UE may not receive an explicit multi-beam NR PDCCH monitoring (re-)configuration in a downlink transmission. In another embodiment, the UE may receive an explicit multi-beam NR PDCCH monitoring (re-)configuration in the downlink transmission.

In some embodiments, a UE may be configured to monitor a first set of beams with a fixed NR PDCCH monitoring occasion, while configured to adjust NR PDCCH monitoring occasion periodicity (e.g., possibly only) for a second set of beams. For example, the first set of beams may be explicitly configured (e.g., as primary control channel beams). For example, the first set of beams may be UE-specifically configured. For example, the second set of beams may be common control channel beams.

Figure 7:
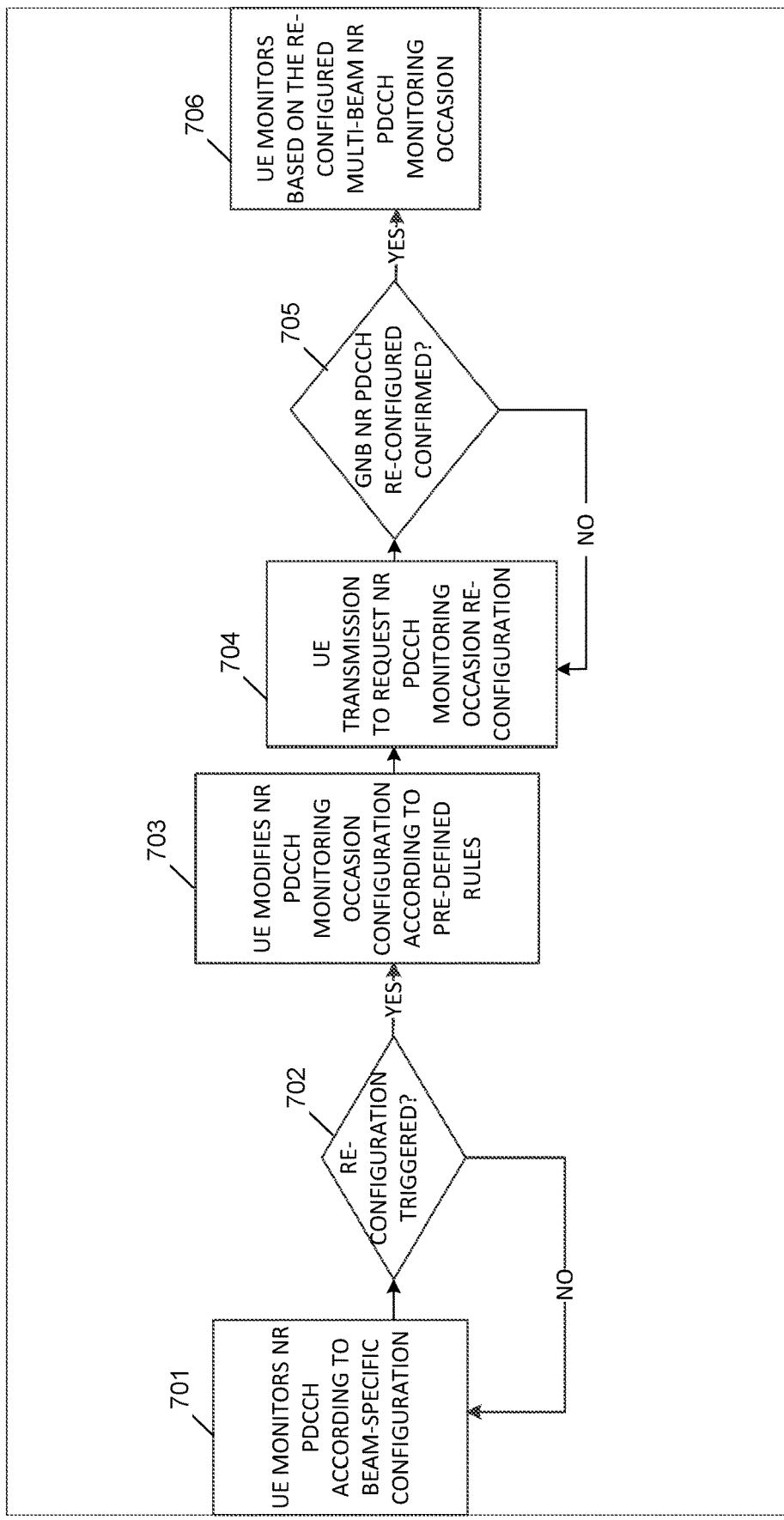
FIG. 7 is a flow diagram of dynamic (re-)configuration of physical downlink channel monitoring occasion in accordance with a UE's request/notification in accordance with an exemplary embodiment.

FIG. 7 is a flow diagram of an exemplary UE-initiated dynamic (re-)configuration of physical downlink channel monitoring occasion.

At operation 701, a UE monitors NR PDCCH according to beam-specific (re-) configuration. At operation 702, the UE determines whether one or more triggering conditions and/or rules for (re-)reconfiguring NR PDCCH monitoring occasions are satisfied. If not satisfied, flow proceeds back to operation 701 in which the UE keeps monitoring the NR PDCCH according to the beam-specific (re-)configuration. If satisfied, the flow proceeds to operation 703, in which the UE modifies and/or re-configures the NR PDCCH monitoring occasion based on the one or more triggering conditions and/or rules.

Next, at operation 704, the UE transmits (e.g., to a gNB or eNB) a request or notification for NR PDCCH (re-) configuration transmission (e.g., using PUCCH or PRACH). In some embodiments, the PUCCH resource (re-)configuration may be associated with the DCI transmission parameters of the configured downlink beam with minimum or maximum active NR PDCCH occasion monitoring periodicity, e.g., beam-specific index of DL BWP, CORESET, search space, etc. In some embodiments, the UE may select a TX beam based for the message on beam correspondence with the downlink beam with minimum, maximum, or lower active NR PDCCH occasion monitoring periodicity. In some embodiments, a UE may use a TX beam corresponding to the configured downlink beam with monitoring occasion periodicity of (1:1), e.g., when monitoring another configured downlink beam with another periodicity of (e.g., 1:10). A benefit of this exemplary TX beam selection is that channel conditions of the downlink beam with minimum, maximum, or lower NR PDCCH monitoring occasion periodicity may be better. A UE may use TX beam sweeping for the request transmission when beam correspondence is not present. In some embodiments, the UE may send a NR PDCCH downlink beam indication (e.g., TCI state) of the configured downlink beam for which the (re-)configuration is being requested.

In addition, the UE may include information that indicates the requested NR PDCCH monitoring (re-)configuration.

Particularly, in an embodiment, the UE may transmit an index corresponding to the requested NR PDCCH monitoring occasion periodicity, e.g., based on a pre-configured association and/or mapping. As shown in Table 1 below, the UE may transmit an index associated with a NR PDCCH (re-)configuration of one monitoring occasion every Y number of slot(s), where Y is an integer. For example, the UE may transmit an index of 4 to request a NR PDCCH (re-)configuration of one monitoring occasion every 10 slots (1:10) for the configured downlink beam indicated by the TCI state.

TABLE 1

| | NR PDCCH monitoring periodicity index | | | | |
|---|---|---|---|---|---|
| | 1 | 2 | 3 | 4 | 5 |
| Value | Once every slot (1:1) | Once every two slots (1:2) | Once every five slots (1:5) | Once every ten slots (1:10) | Once every twenty slots (1:20) |

In another embodiment, the UE may include an indication regarding upscaling or downscaling of the NR PDCCH monitoring occasion periodicity without using an absolute value. For example, the UE may transmit an UCI bit indicating UP or DOWN of the monitoring periodicity with a pre-configured step size. In addition, the UE may include information that indicate the modified aggregation levels and PDCCH candidates, e.g., using a pre-configured indexing and/or mapping.

In response to the request issued in operation 704, the gNB (or eNB) may adjust the NR PDCCH monitoring (re-)configuration triggered on the NR PDCCH (re-)configuration request/notification transmission. The gNB may determine the re-configured NR PDCCH parameters such as NR PDCCH occasion monitoring periodicity based on the information indicated in the transmission. The gNB may modify the DCI transmission according to the re-configured parameters. At operation 705, the gNB transmits a confirmation of the NR PDCCH (re-)configuration (possibly including the modified DCI) and the UE may receive the confirmation of the NR PDCCH (re-)configuration from gNB, in response to the request or notification. The confirmation from the gNB may be sent, e.g., via explicit L1 and/or higher layer signaling.

Upon receipt of the confirmation, the UE may begin monitoring based on the reconfigured multi-beam NR PDCCH monitoring occasion at operation 706.

II.G Implicit NR PDCCH Monitoring Occasion (Re-) Configuration

In an embodiment, the UE may be configured, e.g., via system broadcast information and/or higher layer signaling, indicating whether implicit NR PDCCH monitoring (re-)configuration may be applied.

The UE may not send any requests to the gNB to (re-)configure NR PDCCH monitoring occasion. Without the UE's explicit request, the gNB may send information or parameters for multi-beam NR PDCCH monitoring (re-)configuration in the downlink transmission, which is referred to as implicit NR PDCCH monitoring occasion (re-)configuration herein.

The gNB may re-configure NR PDCCH monitoring configuration parameters based on at least one of the following triggering conditions and/or rules:

L1 beam management measurement feedback, e.g., beam-specific L1-RSRP and interference measurement using beam-specific CSI-RS or SSB;

beam-specific L1 channel measurement feedback, e.g., CQI result;

number of HARQ ACK/NACKs associated with DCI transmissions decoded in each configured downlink beam; and number of DTX associated with DCI transmissions decoded in each configured downlink beam.

The gNB may apply the same or different triggering conditions and/or rules as those of the UE. Applying one or more triggering conditions and/or rules, the gNB may send an explicit multi-beam NR PDCCH monitoring (re-)configuration in the downlink transmission.

Figure 8:
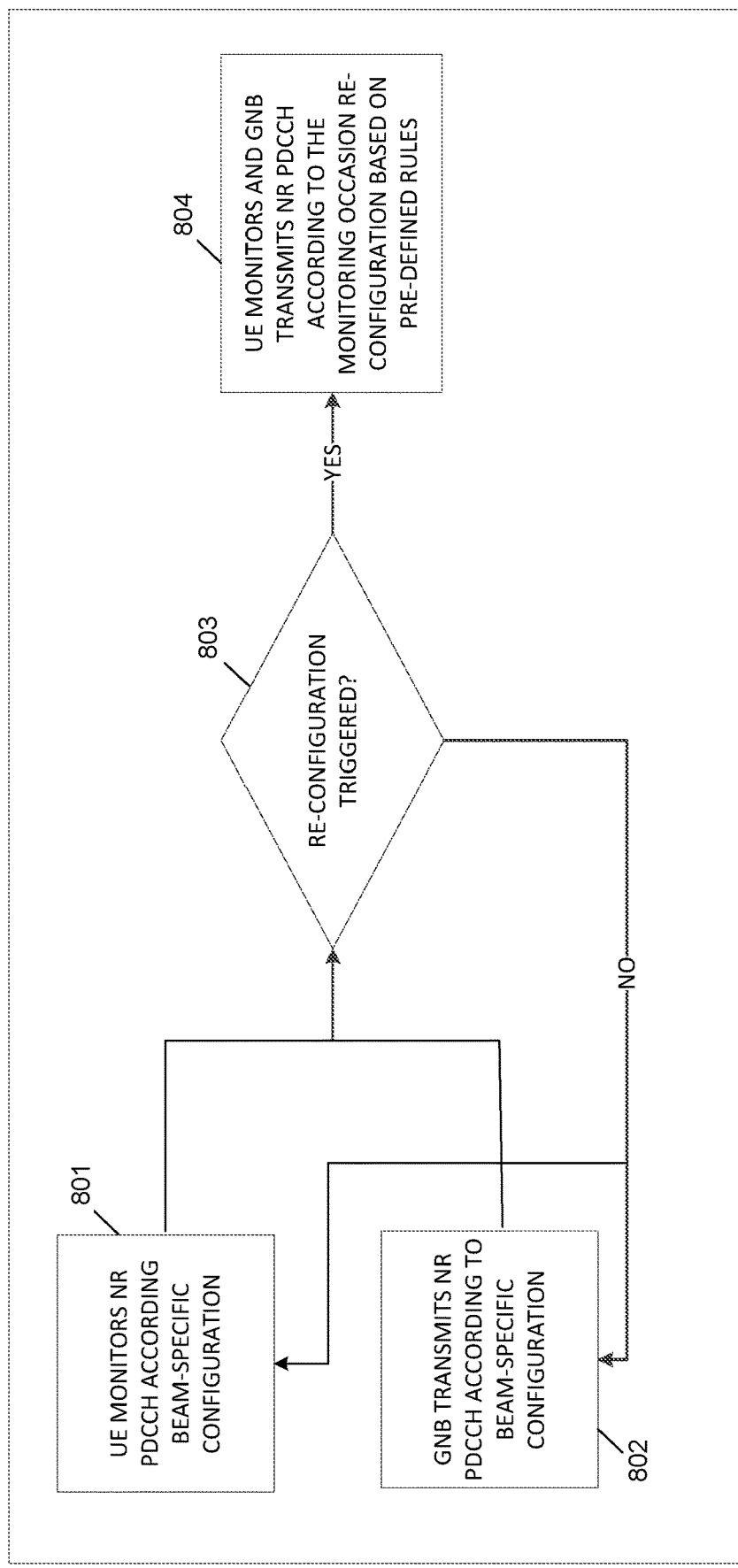
FIG. 8 is a flow block diagram of implicit dynamic (re-)configuration of physical downlink channel monitoring occasion based on triggering conditions and/or rules in accordance with another exemplary embodiment.

FIG. 8 is a flow diagram of implicit dynamic (re-)configuration of physical downlink channel monitoring occasion based on one or more triggering conditions and/or rules in accordance with an exemplary embodiment. At operation 801, the UE monitor NR PDCCH, e.g., according to a beam-specific (re-)configuration. At operation 802, the gNB transmits the NR PDCCH, e.g., according to beam-specific (re-)configuration. At operation 803, the UE may determine whether one or more of the triggering conditions and/or rules to reconfigure the NR PDCCH monitoring occasion e.g., (as disclosed above) has occurred. If so, at operation 804, the UE monitors and the gNB may transmit NR PDCCH according to the reconfigured monitoring occasion (e.g., based on pre-defined rules). If not satisfied, the UE continues monitoring the NR PDCCH according to the UE's existing beam-specific (re-)configuration (as at operation 801) and the gNB continues transmitting NR PDCCH according to the gNB's existing beam-specific (re-)configuration (as at operation 802.

In an embodiment, the gNB may adjust the NR PDCCH monitoring occasion periodicity using the (e.g., same or similar) rules that the UE may be configured with. In another embodiment, the gNB may adjust the NR PDCCH monitoring occasion periodicity based on a beam-specific L1-RSCP threshold and/or a threshold of any of beam-specific HARQ ACK, HARQ NACK, and DTX that may be used by the UE to perform an (e.g., identical) adjustment.

One potential benefit of implicit NR PDCCH monitoring occasion (re-)configuration may be significant reduction of signaling overhead when achieving an NR PDCCH monitoring, e.g., based on short-term beam-specific channel variation. As a result, a UE may more frequently monitor DCI transmission with less processing on a configured downlink beam with certain channel conditions (e.g., relatively good or better) and avoid wasteful NR PDCCH decoding processing on a downlink beam with other channel conditions (e.g., relatively low, bad, or worse).

II.H Explicit NR PDCCH Monitoring Occasion (Re-)Configuration

The UE may send a request to the gNB to (re-)configure the NR PDCCH monitoring occasions. In response to the UE's explicit request, the gNB may send information or parameters for multi-beam NR PDCCH monitoring (re-)configuration in the downlink transmission, which is referred to herein as explicit NR PDCCH monitoring occasion (re-) configuration.

In an embodiment, a UE may monitor a NR PDCCH (re-)configuration confirmation from a gNB following the NR PDCCH monitoring (re-)configuration request/notification transmission. A UE may receive a confirmation in DCI transmitted in all the configured downlink beams for the multi-beam PDCCH monitoring. In another embodiment, the UE may receive the confirmation in DCI transmitted in the configured downlink beam with lower NR PDCCH monitoring occasion periodicity.

A UE may re-transmit the request or notification for NR PDCCH monitoring occasion (re-)configuration based on pre-configured rules. For example, the UE may be configured with a confirmation monitoring window and the UE may perform (re-)configuration request transmission if the confirmation is not received within the window.

The gNB may determine (re-)configuration information including (re-)configuring parameters based on at least any one of the following triggering conditions and/or rules:

L1 beam management measurement feedback, e.g., beam-specific L1-RSRP and interference measurement using beam-specific CSI-RS or SSB;

Beam-specific L1 channel measurement feedback, e.g., CQI result;

Number of HARQ ACK/NACK associated with DCI transmission decoded in each configured downlink beam; and Number of DTX associated with DCI transmission decoded in each configured downlink beam.

The gNB may include the NR PDCCH monitoring (re-)configuration information in a DCI transmission. For example, the gNB may transmit an index corresponding to a set NR PDCCH monitoring (re-)configuration parameters in one DCI field in the downlink beam with minimum NR PDCCH monitoring occasion periodicity or all configured downlink beam.

II.J Spatial DRX

In an embodiment, the adaptation of NR PDCCH monitoring occasions with multiple serving control channel beams may be modeled as applying discontinuous reception (DRX) in the spatial domain (herein referred to as "spatial DRX"). A (re-)configuration/adaptation of NR PDCCH monitoring occasion may include a change in monitoring periodicity for each configured downlink beam, number of beams to monitor, etc. In some embodiment, the UE may maintain independent DRX cycles on each serving control channel beam. The UE may adjust the NR PDCCH monitoring occasion on each beam, e.g., as a function of quality of the beam, last activity (e.g., successful decoding of DCI) on the beam, events on other serving control beams etc. In other embodiments, the UE may maintain a single DRX cycle, but may adjust the NR PDCCH monitoring occasion as a function of the DRX cycle, e.g., scaling down the monitoring occasion on each beam proportionately when entering a long DRX cycle, etc.

Conclusion

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU 102, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the representative embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory ("RAM")) or non-volatile (e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (e.g., but not always, in that in certain contexts the choice between hardware and software may become significant) a design choice representing cost vs. efficiency tradeoffs. There may be various vehicles by which processes and/or systems and/or other technologies described herein may be effected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although features and elements are provided above in particular combinations, one of ordinary skill in the art will appreciate that each feature or element can be used alone or in any combination with the other features and elements. The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

It is also to be understood that the terminology used herein is for the purpose of describing particular embodiments only, and is not intended to be limiting. As used herein, when referred to herein, the terms "station" and its abbreviation "STA", "user equipment" and its abbreviation "UE" may mean (i) a wireless transmit and/or receive unit (WTRU), such as described infra; (ii) any of a number of embodiments of a WTRU, such as described infra; (iii) a wireless-capable and/or wired-capable (e.g., tetherable) device configured with, inter alia, some or all structures and functionality of a WTRU, such as described infra; (iii) a wireless-capable and/or wired-capable device configured with less than all structures and functionality of a WTRU, such as described infra; or (iv) the like. Details of an example WTRU, which may be representative of any UE recited herein, are provided below with respect to FIGS. 1A-1D.

In certain representative embodiments, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

The herein described subject matter sometimes illustrates different components contained within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of" multiples of the items and/or the categories of items, individually or in conjunction with other items and/or other categories of items. Moreover, as used herein, the term "set" or "group" is intended to include any number of items, including zero. Additionally, as used herein, the term "number" is intended to include any number, including zero.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc.

As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, ¶6 or means-plus-function claim format, and any claim without the terms "means for" is not so intended.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used m conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WRTU, UE, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

What is claimed is:
1. A wireless transmit/receive unit (WTRU) comprising circuitry, including a transmitter, a receiver, a processor and memory, configured to:
receive first and second beams of physical downlink channel transmissions on respective monitoring occa- sions according to respective first and second monitoring occasions configurations;
determine at least one of (i) a third monitoring occasions configuration, different from the first monitoring occasions configuration, for the first beam based on first measurements of, or associated with, the first beam and (ii) a fourth monitoring occasions configuration, different from the second monitoring occasions configuration, for the second beam based on second measurements of, or associated with, the second beam;
transmit, to a network, information indicating the at least one of the third and fourth monitoring occasion configurations; and
receive the first and second beams, wherein:
at least one of first and second beams is received on respective monitoring occasions according to the at least one of the third and fourth monitoring occasions configurations; and
at most one of the first and second beams is received on monitoring occasions according to the corresponding first and the second monitoring occasion.

2. The WTRU of claim 1, wherein each of the monitoring occasions and each of the first, second, third and fourth monitoring occasions configurations comprises at least one of a periodicity and a duration.

3. The WTRU of claim 1, wherein the circuitry being configured to determine the at least one of the third and fourth monitoring occasions configurations comprises the circuitry being configured to determine at least one of:
both the third and fourth monitoring occasions configurations based on first and second channel conditions for the first and second beams, respectively, being satisfactory or better than satisfactory, wherein the third and fourth monitoring occasions configurations comprise respective periodicities having longer intervals than first and second periodicities of the first and second monitoring occasions;
both the third and fourth monitoring occasions configurations based on the first and second channel conditions being less than satisfactory, wherein the third and fourth monitoring occasions configurations comprise respective periodicities having shorter intervals than the first and second periodicities;
one of the third and fourth monitoring occasions configurations based on the corresponding one of the first and second channel conditions being satisfactory or better than satisfactory, wherein the corresponding one of the third and fourth monitoring occasions configurations comprises a periodicity having a longer interval than the corresponding one of the first and second periodicities; and
one of the third and fourth monitoring occasions configurations based on the corresponding one of the first and second channel conditions being unsatisfactory, wherein the corresponding one of the third and fourth monitoring occasions configurations comprises a periodicity having a shorter interval than the corresponding one of the first and second periodicities.

4. The WTRU of claim 1, wherein the first and second beams are beamformed directional beams.

5. The WTRU of claim 1, wherein any of the first and second measurements comprises at least one of:
a beam management measurement;
an interference measurement based on a beam-specific channel state information reference signal;
an interference measurement based on a synchronization signal block;
a beam specific channel quality measurement;
a beam link monitoring measurement;
a beam specific physical downlink channel decoding result;
a hypothetical physical downlink channel block error rate;
a successful reception of a physical downlink control channel transmission in an association window;
one or more hybrid automatic repeat request acknowledgments associated with a physical downlink control channel transmission;
one or more hybrid automatic repeat request non-acknowledgements associated with a physical downlink control channel transmission; and
one or more discrete transmissions associated with a physical downlink control channel transmission.

6. The WTRU of claim 1, wherein the circuitry is configured to, responsive to a beam failure for at least one of the first and second beams, transmit to the network information to request reconfiguration of current monitoring occasions, and wherein the current monitoring occasions are based, at least in part, on the at least one of the third and fourth monitoring occasions configurations.

7. The WTRU of claim 1, wherein the information indicating the at least one of the third and fourth monitoring occasions configurations comprises at least one index associated with the at least one of the third and fourth monitoring occasions configurations.

8. The WTRU of claim 7, wherein the circuitry is configured to receive, from the network, a confirmation of the at least one of the third and fourth monitoring occasion configurations.

9. The WTRU of claim 1, wherein the physical downlink channel transmissions comprise any of one or more physical downlink control channel transmissions and one or more physical downlink shared channel transmissions.

10. The WTRU of claim 1, wherein at least one of:
the third monitoring occasions configuration comprises a periodicity different from a periodicity of the first monitoring occasion;
the third monitoring occasions configuration comprises a duration different from a duration of the first monitoring occasion;
the fourth monitoring occasions configuration comprises a periodicity different from a periodicity of the second monitoring occasion; and
the fourth monitoring occasions configuration comprises a duration different from a duration of the second monitoring occasion.

11. The WTRU of claim 1, wherein the circuitry is configured to receive information indicating one or more beam specific monitoring configurations, and wherein the one or more beam specific monitoring configurations comprise the first and second monitoring occasions configurations.

12. A method implemented in a wireless transmit/receive unit (WTRU), the method comprising:
receiving first and second beams of a-physical downlink channel transmissions on respective monitoring occasions according to respective first and second monitoring occasions configurations;
determining, by the WTRU, at least one of (i) a third monitoring occasions configuration, different from the first monitoring occasions configuration, for the first beam based on measurements of, or associated with, the first beam and (ii) a fourth monitoring occasions configuration, different from the second monitoring occasions configuration, for the second beam based on second measurements of, or associated with, the second beam;

transmitting, to a network, information indicating the at least one of the third and fourth monitoring occasion configurations; and receiving the first and second beams, wherein:
- at least one of first and second beams is received on respective monitoring occasions according to the at least one of the third and fourth monitoring occasions configurations; and
- at most one of the first and second beams is received on monitoring occasions according to the corresponding first and the second monitoring occasions.

13. The method of claim 12, wherein each of the monitoring occasions and each of the first, second, third and fourth monitoring occasion configurations comprises at least one of a periodicity and a duration.

14. The method of claim 12, wherein determining the at least one of the third and fourth monitoring occasions configurations comprises determining at least one of:
- both the third and fourth monitoring occasions configurations based on channel conditions for the first and second beams, respectively, being satisfactory or better than satisfactory, wherein the third and fourth monitoring occasions configurations comprise respective periodicities having longer intervals than first and second periodicities of the first and second monitoring occasions;
- both the third and fourth monitoring occasions configurations based on the first and second channel conditions being less than satisfactory, wherein the third and fourth monitoring occasions configurations comprise respective periodicities having shorter intervals than the first and second periodicities;
- one of the third and fourth monitoring occasions configurations based on the corresponding one of the first and second channel conditions being satisfactory or better than satisfactory, wherein the corresponding one of the third and fourth monitoring occasions configurations comprises a periodicity having a longer interval than the corresponding one of the first and second periodicities; and
- one of the third and fourth monitoring occasions configurations based on the corresponding one of the first and second channel conditions being unsatisfactory, wherein the corresponding one of the third and fourth monitoring occasions configurations comprises a periodicity having a shorter interval than the corresponding one of the first and second periodicities.

15. The method of claim 12, wherein the first and second beams are beamformed directional beams.

16. The method of claim 12, wherein any of the first and second measurements comprises at least one of:
- a beam management measurement;
- an interference measurement based on a beam-specific channel state information reference signal;
- an interference measurement based on synchronization signal block (SSB);
- a beam specific channel quality measurement;
- a beam link monitoring measurement;
- a beam specific physical downlink channel decoding result;
- a hypothetical physical downlink channel block error rate;
- a successful reception of a physical downlink control channel transmission in an association window;
- one or more hybrid automatic repeat request acknowledgments associated with a physical downlink control channel transmission;
- one or more hybrid automatic repeat request non-acknowledgments associated with a physical downlink control channel transmission; and
- one or more discrete transmissions associated with a physical downlink control channel transmission.

17. The method of claim 12, further comprising:
responsive to beam failure for at least one of the first and second beams, transmitting to the network information to request reconfiguration of current monitoring occasions, and wherein the current monitoring occasions are based, at least in part, on the at least one of the third and fourth monitoring occasions configurations.

18. The method of claim 12, wherein the information indicating the at least one of the third and fourth monitoring occasions configurations comprises at least one index associated with the at least one of the third and fourth monitoring occasions configurations.

19. The method of claim 18, further comprising receiving, from the network, a confirmation of the at least one of the third and fourth monitoring occasions configurations.

20. The method of claim 12, wherein the physical downlink channel transmissions comprise any of one or more physical downlink control channel transmissions and one or more physical downlink shared channel transmissions.

21. The method of claim 12, wherein at least one of:
- the third monitoring occasions configuration comprises a periodicity different from a periodicity of the first monitoring occasion
- the third monitoring occasions configuration comprises a duration different from a duration of the first monitoring occasion;
- the fourth monitoring occasions configuration comprises a periodicity different from a periodicity of the second monitoring occasion; and
- the fourth monitoring occasions configuration comprises a duration different from a duration of the second monitoring occasion.

22. The method of claim 12, comprising receiving information indicating one or more beam specific monitoring configurations, wherein the one or more beam specific monitoring configurations comprise the first and second monitoring occasions configurations.

* * * * *